United States Patent
Lee et al.

(10) Patent No.: US 10,932,290 B2
(45) Date of Patent: Feb. 23, 2021

(54) UPLINK REFERENCE SIGNAL TRANSMITTING OR RECEIVING METHOD IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Kijun Kim, Seoul (KR); Eunsun Kim, Seoul (KR); Suckchel Yang, Seoul (KR); Yunjung Yi, Seoul (KR); Youngtae Kim, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/517,438

(22) Filed: Jul. 19, 2019

(65) Prior Publication Data
US 2019/0342909 A1 Nov. 7, 2019

Related U.S. Application Data

(63) Continuation of application No. 16/063,191, filed as application No. PCT/KR2016/014815 on Dec. 16, 2016, now Pat. No. 10,397,946.
(Continued)

(51) Int. Cl.
*H04W 72/12* (2009.01)
*H04W 72/04* (2009.01)
(Continued)

(52) U.S. Cl.
CPC .......... *H04W 72/1289* (2013.01); *H04L 5/00* (2013.01); *H04L 5/0048* (2013.01);
(Continued)

(58) Field of Classification Search
CPC .. H04L 5/001; H04W 72/042; H04W 72/0453
See application file for complete search history.

(56) References Cited

U.S. PATENT DOCUMENTS 10,051,615 B2 * 8/2018 Park ...................... H04L 5/0035
10,397,946 B2 8/2019 Lee et al.
(Continued)

OTHER PUBLICATIONS

PCT International Application No. PCT/KR2016/014815, Written Opinion of the International Searching Authority dated Apr. 13, 2017, 7 pages.
(Continued)

*Primary Examiner* — Raj Jain
(74) *Attorney, Agent, or Firm* — Lee, Hong, Degerman, Kang & Waimey

(57) ABSTRACT

Provided is an uplink reference signal transmitting method for a terminal configured to support a length of a transmission time interval (TTI) in a wireless communication system according to an embodiment of the present invention. The method is performed by a terminal and may comprise the steps of: receiving configuration information associated with an uplink reference signal for a plurality of TTIs from a base station; and transmitting an uplink reference signal in at least one TTI from among the plurality of TTIs, using the received configuration information, wherein the configuration information may be included in signaling that schedules at least one TTI from among the plurality of TTIs.

14 Claims, 13 Drawing Sheets

(a)

(b)

Related U.S. Application Data

(60) Provisional application No. 62/426,602, filed on Nov. 28, 2016, provisional application No. 62/422,072, filed on Nov. 15, 2016, provisional application No. 62/417,468, filed on Nov. 4, 2016, provisional application No. 62/405,269, filed on Oct. 7, 2016, provisional application No. 62/401,829, filed on Sep. 29, 2016, provisional application No. 62/333,259, filed on May 8, 2016, provisional application No. 62/317,386, filed on Apr. 1, 2016, provisional application No. 62/291,521, filed on Feb. 5, 2016, provisional application No. 62/288,429, filed on Jan. 28, 2016, provisional application No. 62/269,093, filed on Dec. 17, 2015.

(51) Int. Cl.
*H04W 48/12* (2009.01)
*H04L 27/26* (2006.01)
*H04L 5/00* (2006.01)

(52) U.S. Cl.
CPC ......... *H04L 27/2613* (2013.01); *H04W 48/12* (2013.01); *H04W 72/04* (2013.01); *H04W 72/042* (2013.01); *H04W 72/0453* (2013.01); *H04W 72/0446* (2013.01)

(56) References Cited

U.S. PATENT DOCUMENTS

| | | | |
|---|---|---|---|
| 2013/0322363 A1* | 12/2013 | Chen | H04L 5/001 370/329 |
| 2014/0254421 A1 | 9/2014 | Ahlander et al. | |
| 2014/0286255 A1 | 9/2014 | Nam et al. | |
| 2014/0334460 A1* | 11/2014 | Ko | H04L 5/0016 370/336 |
| 2015/0023270 A1 | 1/2015 | Park et al. | |
| 2015/0249526 A1* | 9/2015 | Kim | H04L 5/0051 370/329 |
| 2017/0126379 A1* | 5/2017 | Choi | H04L 1/0027 |
| 2018/0376495 A1* | 12/2018 | Lee | H04W 48/12 |
| 2019/0313436 A1* | 10/2019 | Lee | H04W 72/1289 |

OTHER PUBLICATIONS

Ericsson, "Physical layer aspects of short TTI for uplink transmissions", R1-157149, 3GPP TSG RAN WG1 Meeting#83, Nov. 2015, 4 pages.

CATT, "System Analysis on TTI Shortening", R1-156613, 3GPP TSG RAN WG1 #83, Nov. 2015, 8 pages.

Huawei, et al., "Discussion on DL RS and UL RS for short TTI", R1-156460, 3GPP TSG RAN WG1 Meeting #83, Nov. 2015, 4 pages.

U.S. Appl. No. 16/063,191, Office Action dated Dec. 17, 2018, 10 pages.

* cited by examiner

DM-RS RE

DM-RS RE

UPLINK REFERENCE SIGNAL TRANSMITTING OR RECEIVING METHOD IN WIRELESS COMMUNICATION SYSTEM, AND APPARATUS THEREFOR

CROSS-REFERENCE TO RELATED APPLICATIONS

This application is a continuation of U.S. patent application Ser. No. 16/063,191, filed on Jun. 15, 2018, now U.S. Pat. No. 10,397,946, which is the National Stage filing under 35 U.S.C. 371 of International Application No. PCT/KR2016/014815, filed on Dec. 16, 2016, which claims the benefit of U.S. Provisional Application No. 62/269,093, filed on Dec. 17, 2015, 62/288,429, filed on Jan. 28, 2016, 62/291,521, filed on Feb. 5, 2016, 62/317,386, filed on Apr. 1, 2016, 62/333,259, filed on May 8, 2016, 62/401,829, filed on Sep. 29, 2016, 62/405,269, filed on Oct. 7, 2016, 62/417,468, filed on Nov. 4, 2016, 62/422,072, filed on Nov. 15, 2016 and 62/426,602, filed on Nov. 28, 2016, the contents of which are all hereby incorporated by reference herein in their entirety.

TECHNICAL FIELD

The present invention relates to a wireless communication system, and more particularly, to a method of transmitting or receiving an uplink reference signal in a wireless communication system and an apparatus therefor.

BACKGROUND ART

In a wireless cellular communication system, discussion on a transmission/reception method capable of reducing latency as much as possible is in progress. In particular, according to the method, data is transmitted as soon as possible within a short time period using a short TTI (transmission time interval) for a service/UE sensitive to latency and a response is transmitted within a short time period in response to the data. On the contrary, it is able to transmit/receive data using a longer TTI for a service/UE less sensitive to latency. For a service/UE sensitive to power efficiency rather than latency, it may be able to repeatedly transmit data using the same low power or transmit data by more extending TTI. The present invention proposes a method of allocating a resource of a reference signal, a transmission method, and a multiplexing scheme to enable the abovementioned operations.

DISCLOSURE OF THE INVENTION

Technical Task

A technical task of the present invention is to provide a method of transmitting or receiving an uplink reference signal in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink reference signal for a terminal configured to support multiple TTI (transmission time interval) lengths in a wireless communication system, includes receiving configuration information on an uplink reference signal for a plurality of TTIs from a base station, and transmitting an uplink reference signal in at least one TTI from among the plurality of TTIs using the received configuration information. In this case, the configuration information may be included in signaling that schedules the at least one TTI from among the plurality of TTIs.

Additionally or alternatively, the uplink reference signal may be transmitted in a symbol of each of the at least one TTI.

Additionally or alternatively, the configuration information may be included in downlink control information that schedules a TTI from among the plurality of TTIs.

Additionally or alternatively, the configuration information may include a bit field indicating TTIs in which the uplink reference signal is to be transmitted, and the bit field may indicate whether or not the uplink reference signal is transmitted in a respective one of a predetermined number of contiguous TTIs including a TTI scheduled by the configuration information.

Additionally or alternatively, the configuration information indicates one of a plurality of candidate patterns in which the uplink reference signal is to be transmitted, and each of the plurality of candidate patterns may indicate a TTI or a symbol of a TTI, included in a predetermined time duration in which the uplink reference signal is transmitted.

Additionally or alternatively, the method may further include receiving information on a symbol of the at least one TTI in which the uplink reference signal is to be transmitted.

Additionally or alternatively, the configuration information includes a bit field indicating a symbol of a TTI in which the uplink reference signal is to be transmitted, and the bit field may indicate symbols of a predetermined number of contiguous TTIs including a TTI scheduled by the configuration information.

Additionally or alternatively, configuration information to be used for transmitting the uplink reference signal may be included in signaling that schedules a predetermined TTI from among the plurality of TTIs.

Additionally or alternatively, the configuration information can be included in signaling that schedules a TTI to which a largest uplink transmission resource is allocated, from among the plurality of TTIs.

Additionally or alternatively, the terminal may expect that signaling for scheduling the plurality of TTIs indicates configuration information on the same uplink reference signal.

Additionally or alternatively, the configuration information can include at least one selected from the group consisting of a cyclic shift, an OCC (orthogonal cover code), transmit power, RE (resource element) mapping of an uplink reference signal, and resource allocation.

To further achieve these and other advantages and in accordance with the purpose of the present invention, according to a different embodiment, a terminal configured to support multiple TTI (transmission time interval) lengths in a wireless communication system includes a transmitter and a receiver, and a processor that controls the transmitter and the receiver, the processor controls the receiver to receive configuration information on an uplink reference signal for a plurality of TTIs from a base station, controls the transmitter to transmit an uplink reference signal in at least one TTI from among the plurality of TTIs using the received configuration information. In this case, the configuration information may be included in signaling that schedules the at least one TTIs from among the plurality of TTIs.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently transmit or receive an uplink reference signal in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
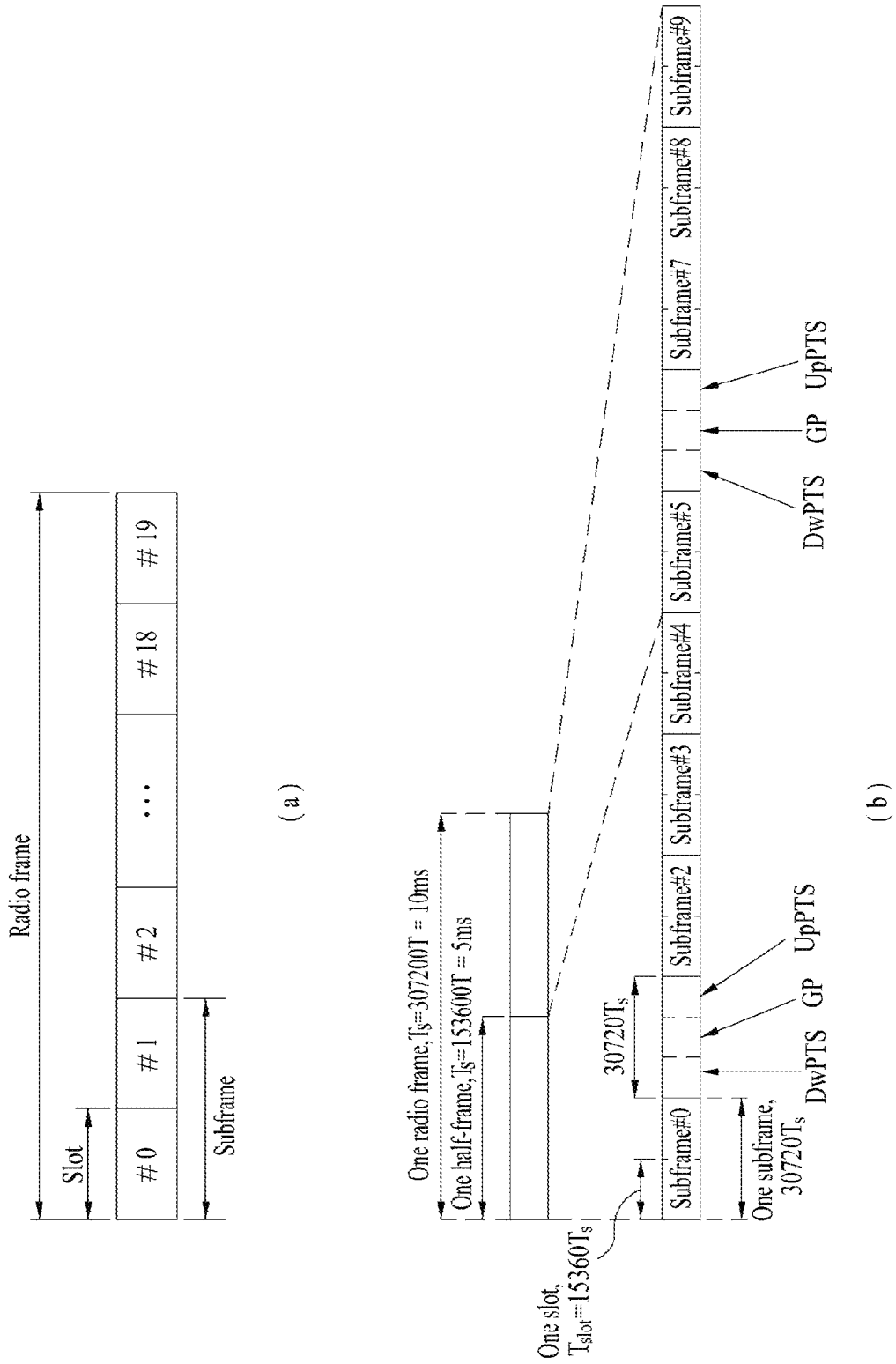
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
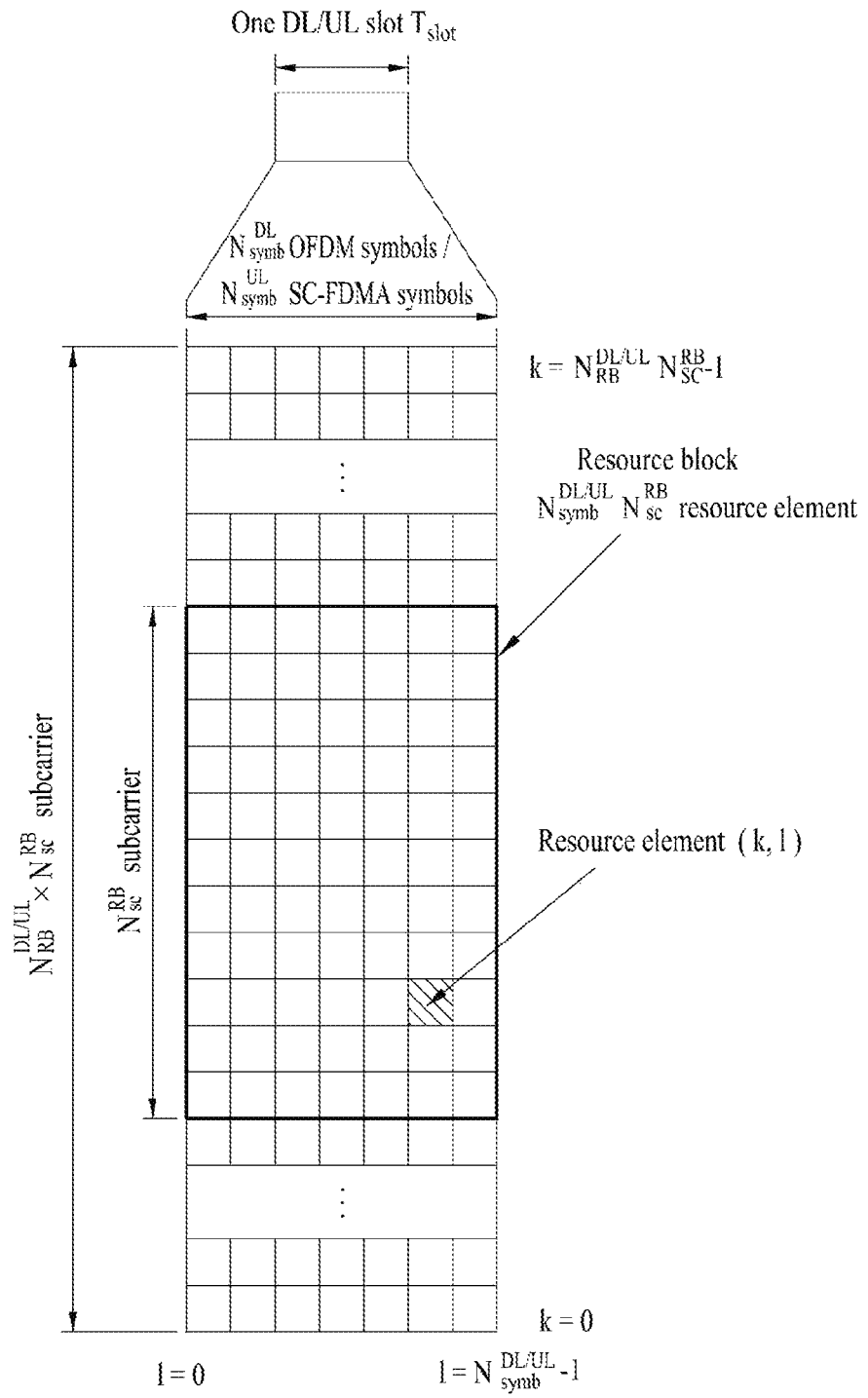
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
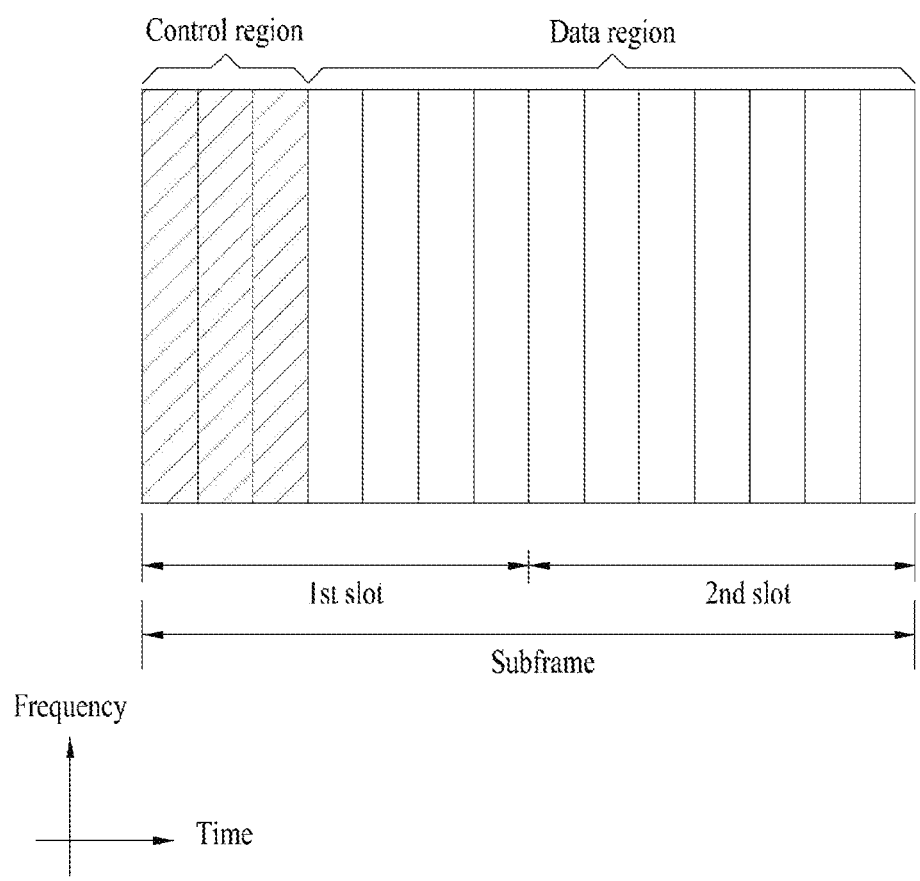
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
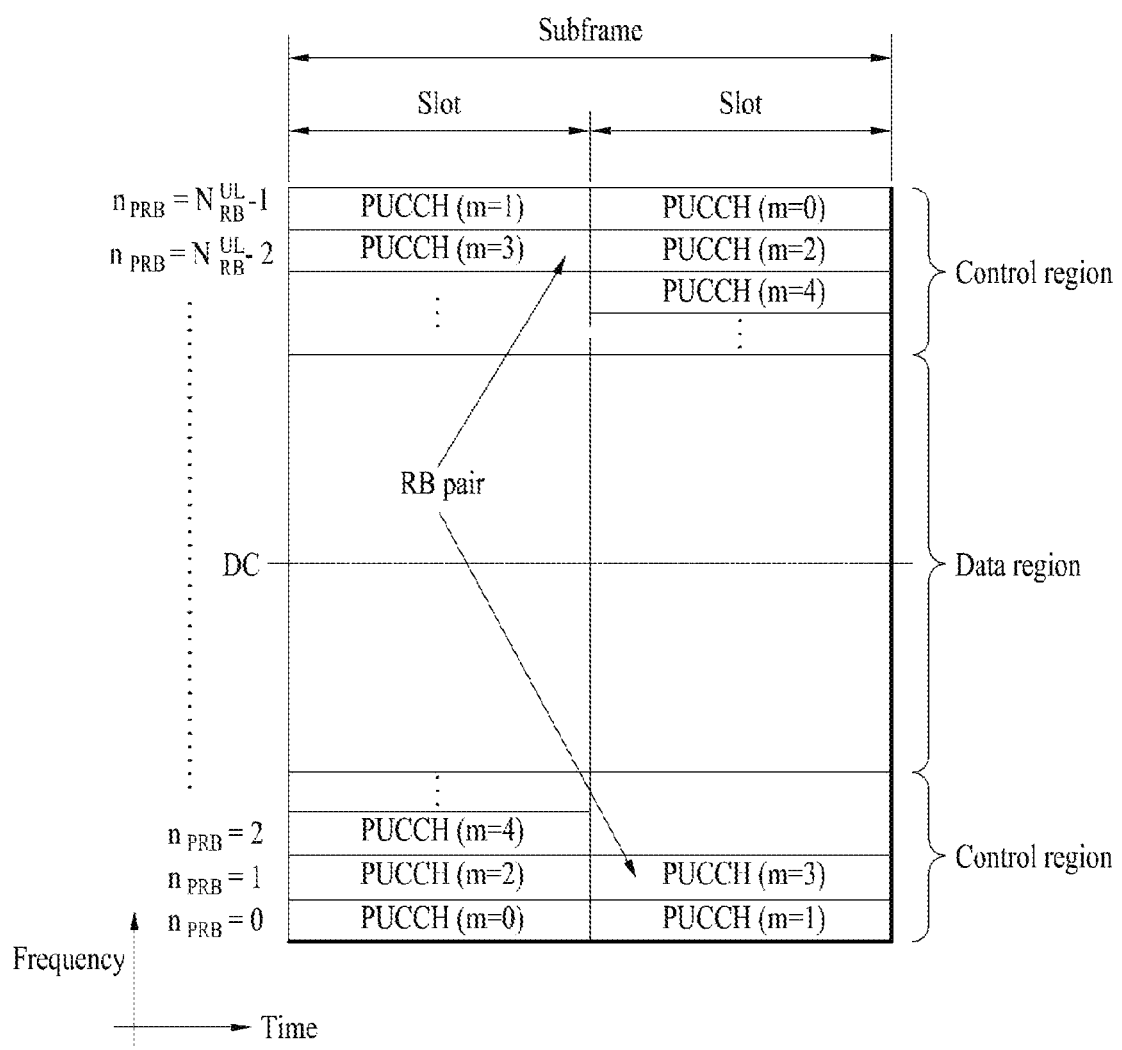
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

Figure 5:
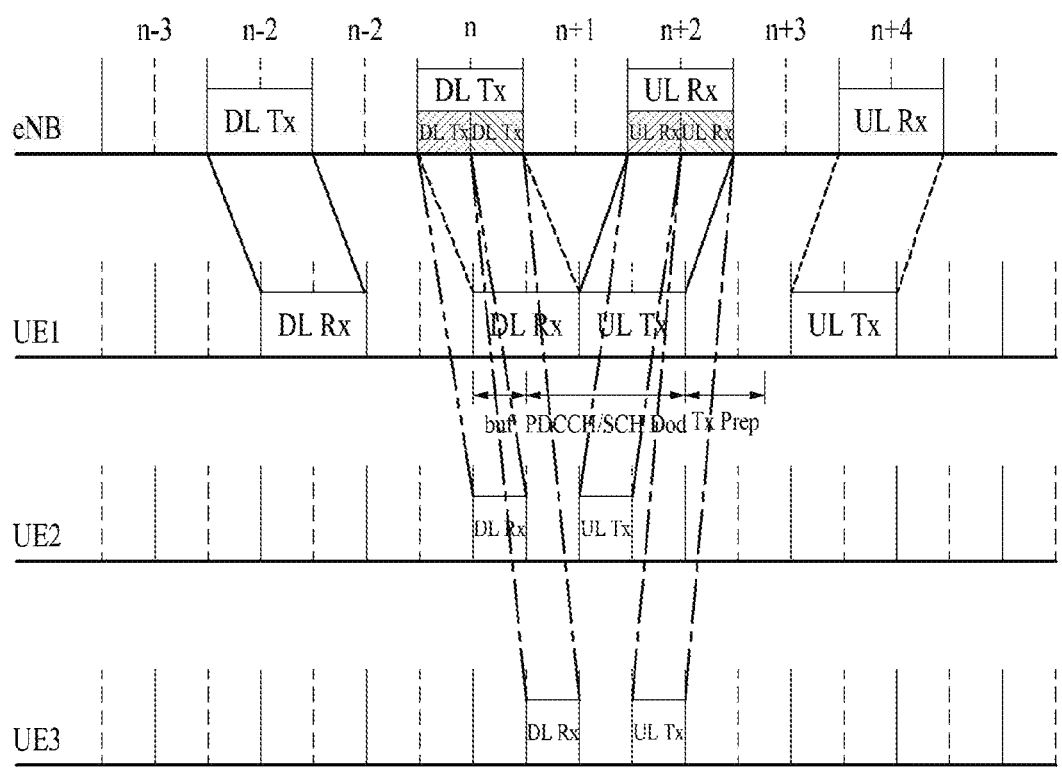
FIG. 5 is a diagram illustrating DL reception timing and UL transmission timing of UEs operating with a different TTI (transmission time interval)
Figure 6:
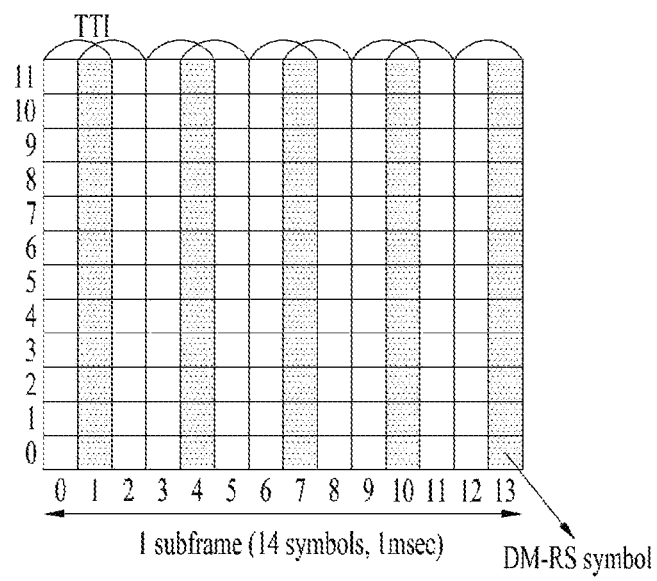
FIG. 6 illustrates a DM-RS (demodulation-reference signal) symbol shared between TTIs.
Figure 7:
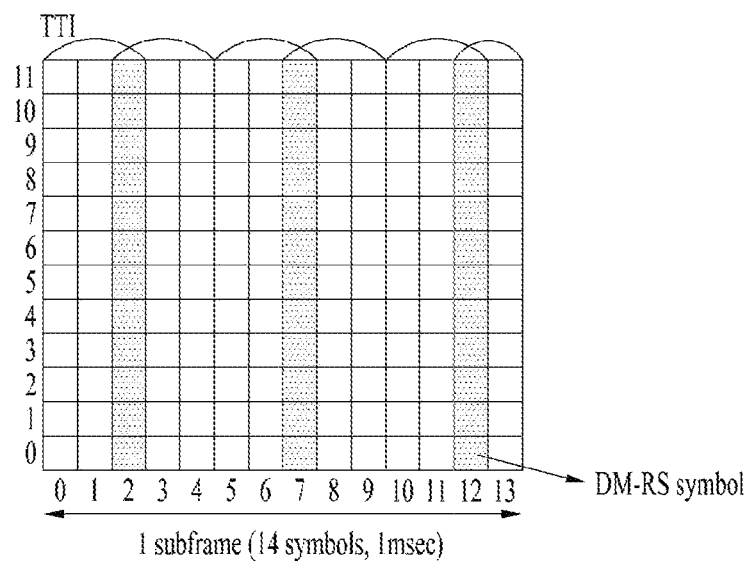
FIG. 7 illustrates a DM-RS (demodulation-reference signal) symbol shared between TTIs.
Figure 8:
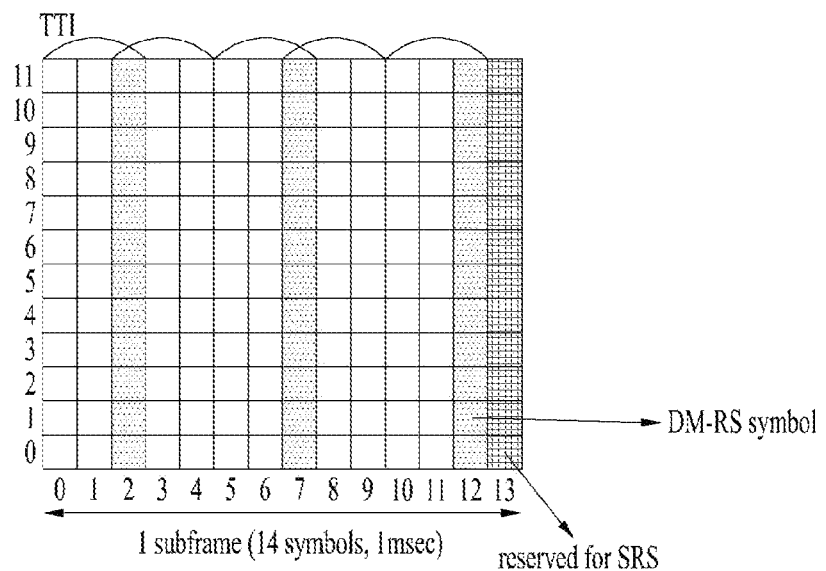
FIG. 8 illustrates a DM-RS (demodulation-reference signal) symbol and a reserved SRS (sounding reference signal) symbol shared between TTIs.
Figure 9:
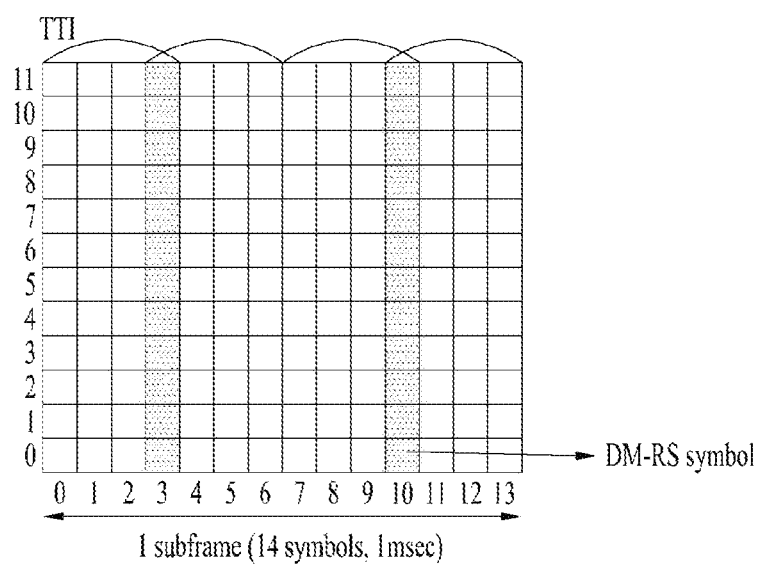
FIG. 9 illustrates a DM-RS (demodulation-reference signal) symbol shared between TTIs.

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel. In case of transmission of 0.5 TTI, when a DL channel is transmitted in a specific $n^{th}$ subframe, an eNB can receive a response in an $(n+2)^{th}$ subframe in response to the DL channel. In particular, in order to support TTIs of a different length, it is necessary to support backward compatibility to prevent an impact on a UE operating in a legacy system only for DL and UL multiplexing of channels having a different TTI.

When DL/UL channels having a different length of TTI are multiplexed, it is necessary to define a method for a UE, which has received the channels, to read a control channel and transmit/receive a data channel A UE supporting a normal TTI only, a UE supporting a normal TTI and a short TTI, and a UE supporting a normal TTI, a short TTI, and a long TTI may coexist in a system. In this case, when a UE supports a short TTI and a normal TTI, it means that the UE is able to receive and demodulate both a channel transmitted with a short TTI ("short TTI channel") and a channel transmitted with a normal TTI ("normal TTI channel") and is able to generate and transmit the short TTI channel and the normal TTI channel in UL.

In a legacy LTE/LTE-A system, one subframe, i.e., a TTI, has a length of 1 ms and one subframe includes two slots. One slot corresponds to 0.5 ms. In case of a normal CP, one slot includes 7 OFDM symbols. A PDCCH (physical downlink control channel) is positioned at a forepart of a subframe and is transmitted over the whole band. A PDSCH (physical downlink shared channel) is transmitted after the PDCCH. PDSCHs of UEs are multiplexed on a frequency axis after a PDCCH section. In order for a UE to receive PDSCH of the UE, the UE should know a position to which the PDSCH is transmitted. Information on the position, MCS information, RS information, antenna information, information on a transmission scheme, information on a transmission mode (TM), and the like can be obtained via the PDCCH. For clarity, PDCCH having a short TTI and PDSCH having a short TTI are referred to as sPDCCH and sPDSCH, respectively. If a UE receives the sPDSCH, the UE transmits HARQ-ACK via a PUCCH (physical uplink control channel) in response to the sPDSCH. In this case, a PUCCH having a short TTI is referred to as sPUCCH.

When it is able to configure one or a plurality of TTIs (e.g., shorter than 1 ms) different from 1 ms TTI in a legacy LTE/LTE-A system, the present invention proposes a method of designing a reference signal (PUSCH DM-RS) for an uplink channel. For clarity, the present invention considers a "short UL TTI" shorter than 1 ms. The short UL TTI consists of symbols in which a data channel and a DM-RS are transmitted.

In the following description, proposal, or embodiments, such a terminology as a terminal and a UE can be used in a manner of being mixed. However, the scope of the invention is not restricted by the terminology itself. In a broad sense, the terminal and the UE can be referred to as a transceiver. And, in the following description, proposal, or embodiments, such a terminology as a base station and an eNB can be used in a manner of being mixed. However, the scope of the invention is not restricted by the terminology itself. In a broad sense, the base station and the eNB can be referred to as a transceiver.

PUSCH DM-RS Design

Shared DM-RS Symbol Having a Different Cyclic Shift Between Two TTIs Adjacent to Each Other According to legacy LTE standard, PUSCH has a transmission structure that one DM-RS symbol per slot is transmitted in an RB. However, in case of supporting a short UL TTI, according to a legacy DM-RS transmission structure, a TTI not including a DM-RS symbol may exist. On the contrary, if a DM-RS symbol is configured in every TTI to guarantee channel estimating/decoding performance of a PUSCH to be transmitted with a short UL TTI, since a length of a TTI is shortened, DM-RS overhead is rapidly increased. Hence, in order to efficiently support a short UL TTI, it may consider a method of sharing a DM-RS in a symbol between two adjacent TTIs.

Specifically, when two TTIs adjacent each other transmit a DM-RS in the same symbol (i.e., one symbol), it may be able to define a rule that the two TTIs differently use at least one of a base sequence and a cyclic shift. In particular, in order to provide orthogonality to a DM-RS sequence to be used in TTIs adjacent to each other, frequency bands, which are assigned to transmit PUSCH, should be the same as well. If the frequency bands are not the same, it is unable to guarantee orthogonality of a DM-RS sequence. And, according to the present method, it is difficult to support 1 symbol TTI. FIGS. 6, 7, 8, and 9 illustrate an example of configuring a TTI within 1 ms when two TTIs adjacent to each other transmit a DM-RS in the same symbol while using a different cyclic shift. FIGS. 6 to 9 illustrate a case of configuring a short UL TTI of one type length. Yet, the abovementioned proposal can also be applied to a case of configuring a short TTI of a plurality of lengths. More generally, when DM-RSs for a plurality of TTIs are transmitted in the same SC-FDMA symbol, it is able to define a rule of differently using at least one of a base sequence and a cyclic shift.

When a plurality of adjacent TTIs transmit DM-RSs in the same symbol, in order to make a plurality of the TTIs use a different cyclic shift, it is able to inform a UE of information on a cyclic shift of a DM-RS corresponding to each PUSCH by including the information in UL grant DCI for scheduling a PUSCH to be transmitted at each of a plurality of the TTIs. Or, it may be able to predefine a rule that a value induced from a combination of at least one selected from the group consisting of a TTI index (e.g., even number or odd number), an RNTI of a UE, a physical layer cell ID of an eNB, a length of a TTI, and a start symbol index of a TTI as a cyclic shift of a DM-RS corresponding to each PUSCH.

Shared DM-RS Symbol to Which a Different Comb/FDM is Applied Between Two TTIs Adjacent to Each Other As a different method, when two TTIs adjacent to each other transmit a DM-RS in the same symbol, it may be able to define a rule that a DM-RS corresponding to a first TTI and a DM-RS correspond to a second TTI are to be mapped to a different RE in the symbol. More generally, when DM-RSs for a plurality of TTIs are transmitted in the same SC-FDMA symbol, it is able to define a rule that a DM-RS corresponding to each TTI is to be mapped to a different RE.

Figure 10:
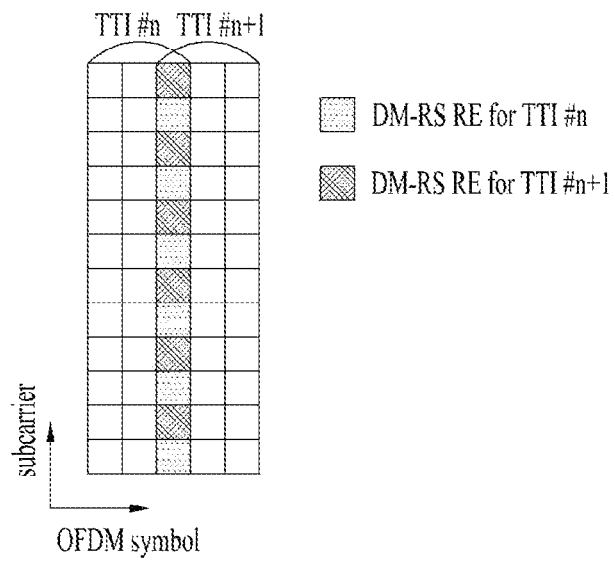
FIG. 10 illustrates an example of a DM-RS symbol shared between TTIs.

Specifically, when two TTIs adjacent each other transmit a DM-RS in the same symbol, it is able to define a rule that a DM-RS signal corresponding to a specific TTI is transmitted to in RE (i.e., even numbered comb) corresponding to an even numbered subcarrier index in the symbol and a DM-RS signal corresponding to the remaining TTI rather than the specific TTI is transmitted in an RE (i.e., odd numbered comb) corresponding to an odd numbered subcarrier index in the symbol. FIG. 10 illustrates an example that a DM-RS RE for each TTI is mapped to a symbol. In FIG. 10, although a symbol between two TTIs is used for a DM-RS for the two TTIs, a symbol to which a DM-RS is allocated can be randomly designated. Among TTIs sharing a symbol to which a DM-RS is allocated, the first symbol or the last symbol can be used for transmitting a DM-RS. This can be applied not only to FIG. 10 but also to all drawings.

Figure 11:
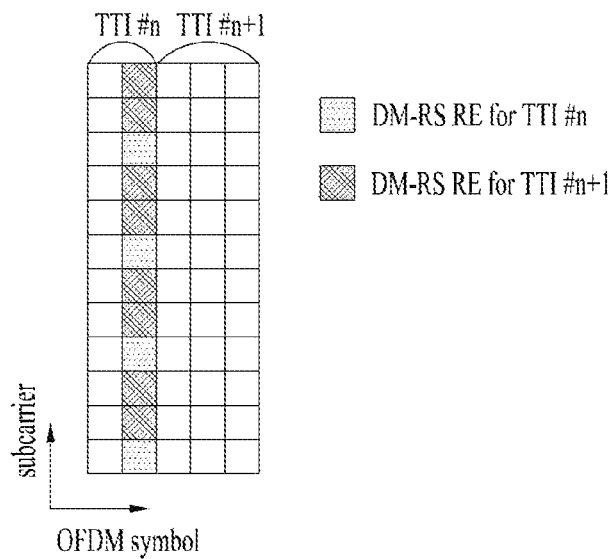
FIG. 11 illustrates an example of a DM-RS symbol shared between TTIs.

As a further different example, it is able to define a rule that the number of REs in which a DM-RS signal of a TTI is transmitted is determined in proportion to a length of the TTI. For example, if a DM-RS for a TTI of two adjacent symbols and a DM-RS for a TTI of four symbols are transmitted in the same symbol, among 12 REs, the DM-RS for the TTI of two symbols is allocated to 4 REs and the DM-RS for the TTI of four symbols can be allocated to 8 REs. This is shown in FIG. 11.

Whether a DM-RS signal corresponding to a specific TTI is transmitted in an even numbered comb or an odd numbered comb can be implicitly determined by a predefined rule (e.g., a first PRB index can determine the even numbered comb or the odd numbered comb). Or, the decision can be configured via higher layer signaling or physical layer signaling. More generally, (1) the number of REs to which a DM-RS signal corresponding to a specific TTI is mapped among the total REs and (2) indexes of REs to which a DM-RS signal corresponding to a specific TTI is mapped can be implicitly determined by a predefined rule or can be configured via higher layer signaling or physical layer signaling. (1) The number of REs to which the DM-RS signal corresponding to the specific TTI is mapped among the total REs and (2) the indexes of the REs to which the DM-RS signal corresponding to the specific TTI is mapped can be independently configured according to a DM-RS symbol shared by a plurality of TTIs adjacent to each other.

As mentioned in the foregoing description, when DM-RSs for a plurality of TTIs are transmitted in the same SC-FDMA symbol, if a DM-RS corresponding to each TTI is mapped to a different RE, PUSCH transmit power and DM-RS transmit power can be differently configured. The DM-RS transmit power may use a value indicated to a UE via higher layer signaling/physical layer signaling or a value derived from the PUSCH transmit power according to a predefined rule.

PHICH Resource Determination

According to current LTE standard, a PHICH resource index is determined by a first PRB index assigned for PUSCH and a DM-RS cyclic shift. When comb-based multiplexing is introduced, if HARQ management using PHICH is considered, the PHICH resource index can be determined not only by the first PRB index and the DM-RS cyclic shift but also by comb index-related information (e.g., even number/odd number, first DM-RS RE, etc.) and/or number of DM-RS REs per 1 PRB, and the like.

Dynamic Switching

For TTIs which are adjacent to each other and allocated a same frequency resource for PUSCH transmission, it is able to maintain orthogonality between the DM-RSs although DM-RSs are transmitted as mentioned in the foregoing description. However, since UL resource allocation may be dynamically changed in every TTI, a frequency resource allocation size for PUSCH may be the same or different between TTIs adjacent to each other. In particular, if a resource allocation size for PUSCH is different between TTIs adjacent to each other, it may be more appropriate to apply a different comb/FDM to the two TTIs adjacent to each other. In particular, if it is able to use the abovementioned methods by dynamically switching the methods according to scheduling of an eNB, it is more preferable. To this end, when DM-RSs for a plurality of TTIs are transmitted in the same symbol, it may be able to inform a UE of detail information (e.g., cyclic shift, comb information, etc.) on whether a DM-RS for a specific TTI is mapped to the total REs of a symbol or an RE corresponding to a specific comb via physical layer signaling. The information indicated via the physical layer signaling can be independently (differently) defined/configured according to a TTI length. As a specific example, a legacy specific field (e.g., DM-RS cyclic shift field) included in a UL grant for scheduling PUSCH transmission or a new field can be defined to include information described in the following.

TABLE 5

| cyclic shift field in UL grant DCI | Description |
| --- | --- |
| 000 | even comb ($n_{DMRS, \lambda}^{(2)} = a$) |
| 001 | odd comb ($n_{DMRS, \lambda}^{(2)} = b$) |
| 010 | $n_{DMRS, \lambda}^{(2)} = c$ |
| ... | |
| 111 | $n_{DMRS, \lambda}^{(2)} = h$ |

Note:
a = b = 0, or a = 0, b = 6, or a = 6, b = 0 can be configured, c to h can be configured by a different value.

Shared DM-RS Having a DM-RS Frequency Resource Identically Configured Between Two TTIs Adjacent to Each Other According to current LTE standard, a base sequence for generating a PUSCH DM-RS sequence is differently configured according to UL resource allocation. As mentioned in the foregoing description, when two TTIs transmit DM-RSs in the same symbol, in order to secure orthogonality between two DM-RSs using a different cyclic shift, a resource allocation size for PUSCH to be transmitted to two TTIs should be the same. However, since UL resource allocation can be dynamically changed in every TTI, a frequency resource allocation size may be the same or different between TTIs adjacent to each other. Hence, when two TTIs adjacent to each other transmit DM-RSs in the same symbol, it may be able to allocate a DM-RS transmission resource to a UE irrespective of a resource for transmitting PUSCH and the UE can transmit the PUSCH and the DM-RS using a different UL resource. More generally, when DM-RSs for a plurality of TTIs are transmitted in the same SC-FDMA symbol, a DM-RS transmission resource can be allocated to each TTI irrespective of a resource allocated to transmit PUSCH. Hence, a UE is able to transmit PUSCH and a DM-RS using a different UL resource.

Figure 12:
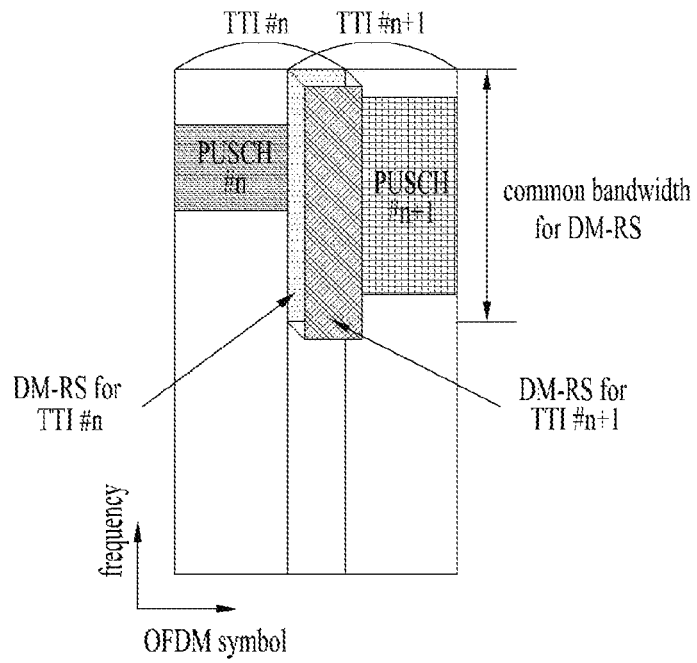
FIG. 12 illustrates an example of a DM-RS symbol shared between TTIs to which an uplink resource of a different size is allocated and a DM-RS for each TTI.

In this case, a UL resource for transmitting the DM-RS allocates a common frequency resource to a plurality of TTIs and may differently use at least one of a base sequence and a cyclic shift. For example, as shown in FIG. 12, if a UL resource for transmitting a DM-RS allocates a common frequency resource to two TTIs adjacent to each other, uses the same base sequence, and uses a different cyclic shift, although a size of a PUSCH resource allocated to the two TTIs adjacent to each other is different, it is able to secure orthogonality between DM-RSs transmitted in the same symbol. And, in order to efficiently demodulate PUSCH, a DM-RS transmission resource can be allocated in a manner of being equal to or greater than a PUSCH transmission resource.

In this case, the UL resource for transmitting the DM-RS can be determined by the specific number of RBs (e.g., a part of the whole UL frequency band) determined in advance, the number of RBs dynamically indicated by an eNB, or the whole UL frequency band irrespective of a UL resource allocated for PUSCH. Or, if the UL resource allocated for PUSCH corresponds to X RB and the UL resource for transmitting the DM-RS corresponds to Y RB, Y=N*X is satisfied. In this case, the N can be configured by an integer promised/defined in advance or an integer signaled via higher layer signaling/physical layer signaling. Or, when a part of the total system bandwidth is configured for a specific TTI length, the whole frequency resource among the partial resource, a resource as much as RBs of a promised/pre-defined size, or a resource as much as RBs signaled via higher layer/physical layer signaling can be defined for the specific TTI length.

In order to support the method above, the eNB can provide the UE with information on resource allocation of a DM-RS to be transmitted by the UE via higher layer signaling. Or, the eNB can provide the UE with information on resource allocation of a DM-RS to be transmitted by the UE via a legacy specific field in UL grant DCI for scheduling PUSCH transmission or a new field. Or, resource allocation of a DM-RS can be determined according to a predefined rule irrespective of a UL resource allocated for PUSCH.

Hopping/Interlacing

More generally, a PUSCH transmission resource and a DM-RS transmission resource can be differently configured in a specific TTI. In this case, the DM-RS transmission resource can be allocated in a manner of being equal to or greater than the PUSCH transmission resource. Preferably, it is able to allocate the DM-RS transmission resource greater than the PUSCH transmission resource. By doing so, when DM-RSs for a plurality of TTIs are transmitted in the same symbol, it is able to support hopping of the PUSCH transmission resource within a TTI.

It is able to define a rule that a PUSCH transmission resource is to be changed according to a predefined time unit (e.g., 1 symbol) or a time unit as much as predetermined time according to a TTI length within a specific TTI. In this case, a resource for transmitting PUSCH can be restricted to a predetermined DM-RS transmission resource region. And, a hopping pattern for the PUSCH transmission resource within a specific TTI can be promised/defined in advance or can be signaled to a UE via higher layer signaling or physical layer signaling.

If a short TTI is introduced, coverage of a sPUSCH can be reduced. In this case, if the PUSCH transmission resource hops within a TTI, it may expect an effect of enhancing reliability with the help of a frequency diversity gain.

Comb-Type DM-RS Without Shared DM-RS Symbol

When a plurality of TTIs transmit DM-RS in the same symbol and it is necessary to secure orthogonality between two DM-RSs using a different cyclic shift, there may exist a constraint that resource allocation sizes for PUSCH to be transmitted at the TTIs to be the same. Or, it is able to secure orthogonality using the same base sequence in an RB unit to avoid the constraint. Yet, this may cause excessive increase of PARR (peak to average power ratio). Hence, it may consider transmitting a comb-type DM-RS for each TTI without sharing a DM-RS in a symbol between a plurality of TTIs. In this case, if a TTI length increases, it may be able to configure the number of REs used for transmitting a DM-RS compared to the total REs to be increased in proportion to the increase of the TTI length. Specifically, "number of REs used for transmitting a DM-RS among the N number of REs within a TTI" can be defined in advance or can be provided to a UE via higher layer signaling or physical layer signaling. In this case, the N can be defined by 'the number of subcarriers corresponding to 1 resource block (i.e., 12)*the number of symbols corresponding to a TTI length'. Or, a ratio of REs used for transmitting a DM-RS to the N number of REs within a TTI can be defined in advance or can be provided to a UE via higher layer signaling or physical layer signaling. Or, the number of REs/ratio of REs used for transmitting a DM-RS during time duration corresponding to a plurality of TTIs can be defined in advance or can be provided to a UE via higher layer signaling or physical layer signaling.

"The number of REs used for transmitting a DM-RS among the N number of REs within a TTI" or "the ratio of REs used for transmitting a DM-RS to the N number of REs within a TTI" can be independently (differently) configured for a plurality of TTIs corresponding to determined time duration (e.g., 1 ms).

When a comb-type DM-RS is transmitted, RE mapping can be defined in advance or can be provided to a UE via higher layer signaling or physical layer signaling. When RE mapping is performed on the comb-type DM-RS proposed in the present invention, it is apparent that the RE mapping is applied irrespective of a DM-RS symbol shared by adjacent TTIs. When the comb-type DM-RS is transmitted, the RE mapping can be performed as follows.

Option 1: DM-RS RE Mapping Configuration According to TTI Length

Figure 13:
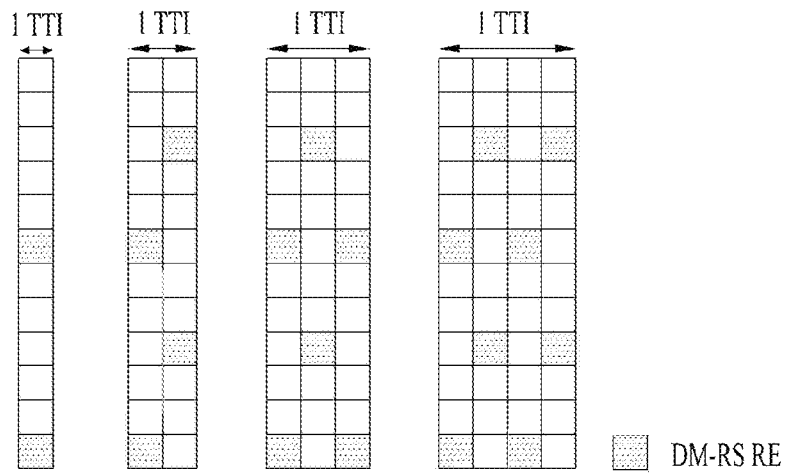
FIG. 13 illustrates an RE pattern to which a DM-RS is mapped according to a size or a length of a TTI.

It may be able to configure unique DM-RS RE mapping according to a TTI length. For example, when a TTI length corresponds to 1, 2, 3, and 4 symbols, the number of DM-RS REs 2, 4, 6, and 8 can be set to a UE. DM-RS RE mapping can be defined as FIG. 13. The DM-RS RE mapping can be expressed by an equation described in the following.

$a_{k,l}^{(p)}$: complex-valued modulation symbols. k corresponds to a subcarrier index and l corresponds to a symbol index.

$$k = 6m' + N_{sc}^{RB} n_{PRB} + k'$$
$$k' = \begin{cases} 0 & \text{if } l\mod 2 = 0 \\ 3 & \text{if } l\mod 2 = 1 \end{cases}$$
$$m' = 0, 1$$

Option 2: DM-RS RE Mapping According to Resource of Short TTI

It may be able to define a rule that DM-RS RE mapping is to be changed according to a position of a TTI. Specifically, it is able to define a rule that DM-RE RE mapping is to be changed according to a position of a TTI within specific time (e.g., 1 ms). In this case, the position of the TTI can be regulated by a starting symbol or an ending symbol of the TTI, a TTI index, or a specific symbol determined by a predetermined rule. When a UE is scheduled at a plurality of TTIs during specific time duration, a network may use a DM-RS of a different TTI to perform channel estimation and decoding on a specific TTI by utilizing different DM-RS RE mapping of each TTI.

Figure 14:
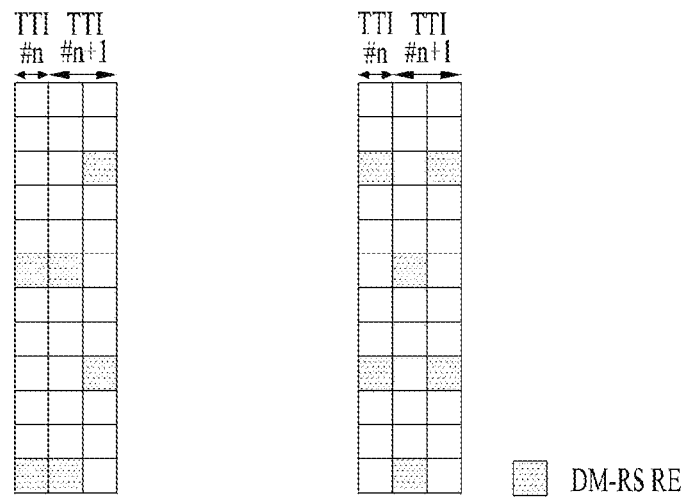
FIG. 14 illustrates an RE pattern to which a DM-RS is mapped in two consecutive TTIs.

For example, when a length of TTI #n and a length of TTI #n+1 are configured by 1 symbol and 2 symbols, respectively, and PUSCH is continuously scheduled to a UE at the two TTIs, DM-RS RE mapping shown in the right drawing of FIG. 14 can be more efficient in estimating a channel compared to DM-RS RE mapping shown in the left drawing of FIG. 14. In this case, it may be able to define a rule that a DM-RS for 1-symbol TTI is to be mapped to a subcarrier index {3, 9} rather than {0, 6}. Or, relevant information can be provided to a UE via higher layer signaling or physical layer signaling.

Figure 15:
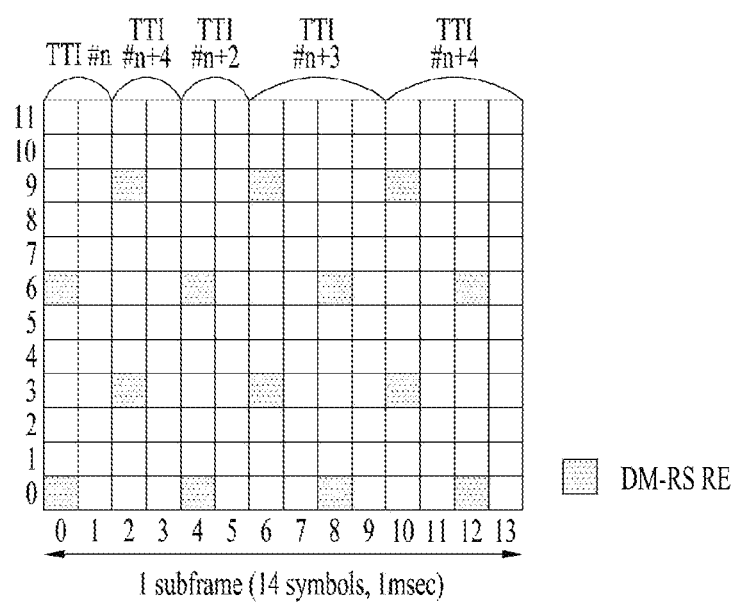
FIG. 15 illustrates an RE pattern to which a DM-RS is mapped in consecutive TTIs.

As a different example, it may be able to define DM-RS RE mapping to be performed during specific time duration (e.g., 1 ms) in advance. In this case, it is able to define a rule that a UE transmits only a DM-RS mapped to a symbol corresponding to a TTI configured to transmit PUSCH. FIG. 15 illustrates an example of the rule.

As a further different example, it may be able to define a rule that RE mapping is to be shifted at every TTI as much as a promised subcarrier index.

As a further different example, it may be able to define a rule that separate DM-RS RE mapping is to be applied according to a frequency resource such as an RB index or the like.

Although the abovementioned options have proposed comb-type DM-RS RE mapping of a staggered form to make DM-RS REs to be evenly distributed to symbols/subcarriers within a specific TTI, the proposed rules can be generally applied to RE mapping (e.g., RE mapping of which more DM-RS REs are defined in a specific symbol) rather than the DM-RS RE mapping of the staggered form.

DM-RS On/Off

When a DM-RS is transmitted at every TTI, if a TTI of a short length (e.g., 1 symbol TTI) is configured, it may cause excessive DM-RS overhead. Hence, it may be able to define a rule that a UE transmits DM-RS during the determined number of TTIs only from among specific time duration corresponding to a plurality of TTIs. For example, it may be able to configure the UE to transmit DM-RS during M (M≤K) number of TTIs only from among time duration corresponding to K number of TTIs. In this case, the number of TTIs during which the DM-RS is transmitted can be defined/promised in advance or can be provided to a UE via higher layer signaling or physical layer signaling.

In order to reduce blind detection of a network, it may be able to configure DM-RS to be transmitted at a predefined TTI or a TTI of signaled timing only among specific time duration corresponding to a plurality of TTIs.

Or, it may be able to configure a UE to transmit a DM-RS to a determined SC-FDMA symbol only from among specific time duration corresponding to a plurality of TTIs. In this case, an index of the SC-FDMA symbol to which the DM-RS is to be transmitted can be defined/promised in advance or can be provided to a UE via higher layer signaling or physical layer signaling.

Regarding each DM-RS or a plurality of DM-RSs to be transmitted during the time duration, it is able to inform a UE of all or a part of information on whether or not a DM-RS is mapped to the entire REs in a symbol, information on whether or not a DM-RS is mapped to an RE corresponding to a specific comb, a DM-RS cyclic shift, an OCC (orthogonal cover code), and comb pattern information via higher layer signaling or physical layer signaling. In this case, specifically, the physical layer signaling may correspond to (1) respective UL grant DCIs that schedule a plurality of TTIs, (2) UL grant DCI that schedules one or more TTIs defined/promised in advance among a plurality of the TTIs, or (3) a specific DCI type (slow/first DCI or fast/second DCI) of two-level DCI.

In this case, the two-level DCI corresponds to DCI which is considered at the time of introducing a sTTI. The slow/first DCI corresponds to DCI which is transmitted at the first sTTI only of every subframe and the fast/second DCI corresponds to DCI which is transmitted at every sTTI. Compared to the fast/second DCI, the slow/first DCI carries more static information. The fast/second DCI can carry more dynamic information.

Or, a plurality of TTIs can be configured as candidates for a TTI at which a DM-RS is to be transmitted among specific time duration. A UE can be configured to transmit a DM-RS for a part of the candidates.

If the TTI at which the DM-RS is to be transmitted is not UL scheduled, PUSCH data can be transmitted only without transmitting the DM-RS during the specific time duration. This is not preferable. In order to prevent the abovementioned case, among the specific time duration corresponding to a plurality of the TTIs, the TTI at which the DM-RS is to be transmitted can be restricted to the first TTI accompanied with PUSCH scheduling.

Collision Between DM-RS and SRS

According to LTE standard, the last SC-FDMA symbol of 1 ms UL subframe can be used for transmitting an SRS. If a short TTI is introduced, according to the aforementioned proposals, a DM-RS symbol can be collided with an SRS symbol in the same symbol.

If a DM-RS for a short TTI and an SRS are configured or promised not to be transmitted at the same time in a specific SC-FDMA symbol, it is able to define a rule that the SRS is to be dropped and the DM-RS is to be transmitted only in the specific SC-FDMA symbol. In this case, the SRS may correspond to a legacy SRS or a new SRS newly introduced for a short TTI. Or, a priority of the SRS and a priority of the DM-RS can be determined according to a symbol index to determine a type of an RS to be dropped. The abovementioned rule can be differently defined according to whether an SRS corresponds to a periodic SRS or an aperiodic SRS.

Shared DM-RS for a UE Which is Scheduled During Two consecutive TTIs

When a plurality of TTIs are configured to transmit a DM-RS in the same symbol, if a plurality of the TTIs are PUSCH scheduled to a UE, it may be difficult for the UE to transmit a DM-RS by differently using a base sequence, a cyclic shift, or a comb pattern. In particular, if a plurality of the TTIs, which are configured to transmit a DM-RS in the same symbol, are PUSCH scheduled to the UE, it is necessary to have a method of transmitting a DM-RS. In the following, a method of transmitting a DM-RS is described in more detail.

Option 1: When a UE transmits a DM-RS in a corresponding symbol, the UE can transmit the DM-RS using a cyclic shift indicated by a UL grant corresponding to PUSCH transmission scheduled at a TTI (e.g., odd numbered or even numbered TTI) which is determined according to a predefined rule and/or a base sequence generated according to a UL resource scheduled at a TTI which is determined according to a predefined rule. Or, when a UE transmits a DM-RS in a corresponding symbol, the UE can transmit the DM-RS using a cyclic shift indicated by a UL grant corresponding to a PUSCH transmission scheduled at a specific TTI configured/indicated via higher layer signaling or physical layer signaling and/or a base sequence generated according to a UL resource scheduled at a specific TTI.

Option 1-a: When a UE transmits a DM-RS in a corresponding symbol, the UE maps/transmits the DM-RS using a comb indicated by a UL grant corresponding to a PUSCH transmission scheduled at a TTI which is determined according to a predefined rule. Or, the UE maps/transmits the DM-RS using a comb implicitly determined for a TTI which is determined according to a predefined rule or a comb configured via higher layer signaling for a TTI which is determined according to a predefined rule.

Option 1-b: When a UE transmits a DM-RS in a corresponding symbol, the UE maps/transmits the DM-RS using a comb indicated by UL grant DCI corresponding to a PUSCH transmission scheduled at a specific TTI which is configured/indicated via higher layer signaling or physical layer signaling. Or, the UE maps/transmits the DM-RS using a comb implicitly determined for a specific TTI which is configured/indicated via higher layer signaling or physical layer signaling or a comb configured by higher layer signaling for a specific TTI which is configured/indicated via higher layer signaling or physical layer signaling.

Option 2: When a UE transmits a DM-RS in a corresponding symbol, the UE can transmit the DM-RS using a cyclic shift indicated by UL grant DCI corresponding to a PUSCH transmission to which a bigger UL resource is allocated among PUSCHs scheduled at a plurality of TTIs and/or a base sequence which is generated according to a bigger UL resource. If PUSCH resources scheduled at a plurality of the TTIs are the same, the UE can transmit the DM-RS using a cyclic shift indicated by UL grant DCI corresponding to a PUSCH transmission scheduled at a TTI (e.g., odd numbered TTI or even numbered TTI) which is determined according to a predefined rule. Or, if PUSCH resources scheduled at a plurality of the TTIs are the same, the UE can transmit the DM-RS using a cyclic shift indicated by UL grant DCI corresponding to a PUSCH transmission scheduled at a specific TTI which is configured/indicated via higher layer signaling or physical layer signaling and/or a base sequence which is generated according to a UL resource scheduled at a specific TTI while transmitting the DM-RS in a corresponding symbol.

Option 2-a: When a UE transmits a DM-RS in a corresponding symbol, the UE can map/transmit the DM-RS using (1) a comb indicated by UL grant DCI corresponding to a PUSCH transmission to which a bigger UL resource is allocated among PUSCHs scheduled at a plurality of TTIs, (2) a comb implicitly determined for a TTI to which a bigger UL resource is allocated among PUSCHs scheduled at a plurality of TTIs, or (3) a comb configured by higher layer signaling for a TTI to which a bigger UL resource is allocated among PUSCHs scheduled at a plurality of TTIs.

Option 3: When a plurality of TTIs are continuously PUSCH scheduled to a UE, it may be able to define a rule that the UE follows a specific cyclic shift value which is specified from a plurality of values indicated by a plurality of UL grant DCI corresponding to a plurality of the TTIs and ignores the remaining values. Or, when a plurality of TTIs are continuously PUSCH scheduled to a UE, it may be able to define a rule that the UE follows a specific cyclic shift value configured/indicated via higher layer signaling. The rule can be applied only when UL resources scheduled at a plurality of the TTIs are the same or a part of the UL resources is overlapped.

Option 4: When DM-RSs for a plurality of TTIs are transmitted in the same symbol and a DM-RS corresponding to each TTI is configured to be mapped to a different RE, a UE maps/transmit the DM-RS to the whole of the symbol without applying a comb. In this case, a value indicated by UL grant DCI on PUSCH, which is scheduled at a predetermined TTI, a predetermined specific cyclic shift value, or a specific cyclic shift value which is configured in advance via higher layer signal can be used as a cyclic shift value.

Option 4-1: More generally, when a plurality of TTIs are continuously PUSCH scheduled to a UE and DM-RSs for a plurality of the TTIs are transmitted in a manner of being mapped to a different frequency resource (e.g., RE) in the same symbol (e.g., using an odd numbered comb type or an even numbered comb type), a rule/method for the UE to transmit a DM-RS is described in the following in detail.

Method 1: A DM-RS sequence can be transmitted in a manner of being mapped to a frequency resource corresponding to the entire PRBs which are allocated to perform PUSCH scheduling in a DM-RS symbol. In this case, a cyclic shift value included in UL grant DCI for PUSCH which is scheduled at a predetermined TTI, a cyclic shift value included in UL grant DCI in case of multi-TTI scheduling, a cyclic shift value included in slow DCI (or fast DCI for a predetermined or signaled TTI) in case of two-level DCI, a predetermined specific cyclic shift value, a specific cyclic shift value configured in advance via higher layer signaling, and the like can be used as a cyclic shift of a DM-RS (in particular, when a cyclic shift value included in UL grant DCI, which schedules a plurality of the TTIs, indicates a different value).

Method 2: When a specific field value, which is included in UL grant DCI scheduling a plurality of TTIs, indicates a different DM-RS transmission scheme or implicitly indicates a different DM-RS transmission scheme, a DM-RS transmission scheme in a corresponding DM-RS symbol can be determined from among a predefined specific DM-RS transmission scheme, a DM-RS transmission scheme indicated by UL grant DCI on PUSCH scheduled by a predetermined TTI, in case of multi-TTI scheduling, a DM-RS transmission scheme indicated by corresponding UL grant DCI, in case of two-level DCI, a DM-RS transmission scheme indicated by slow DCI (or fast DCI for a predetermined or signaled TTI), a predetermined specific DM-RS transmission scheme, and a specific DM-RS transmission scheme configured in advance via higher layer signaling. The abovementioned UE operation can be identically applied irrespective of a specific field value included in UL grant DCI that implicitly indicates a different DM-RS transmission scheme. In this case, the DM-RS transmission scheme can include information indicating whether a DM-RS sequence is mapped to a frequency resource corresponding to the entire PRBs, which are allocated to perform PUSCH scheduling, or a specific frequency resource only similar to a comb-type (with or without power boosting).

Method 3-1: When a specific field value, which is included in UL grant DCI scheduling a plurality of TTIs, indicates a different DM-RS transmission scheme, it may be able to define a rule that a DM-RS sequence is transmitted in a manner of being mapped to a frequency resource corresponding to the entire PRBs, which are allocated to perform PUSCH scheduling. If the specific field value indicates the same DM-RS transmission scheme, similar to a comb-type, it may be able to define a rule that a DM-RS sequence is transmitted in a manner of being mapped to a specific frequency resource only.

Method 3-2: On the contrary, when a specific field value, which is included in UL grant DCI scheduling a plurality of TTIs, indicates a different DM-RS transmission scheme, similar to a comb-type, it may be able to define a rule that a DM-RS sequence is transmitted in a manner of being mapped to a specific frequency resource only. If the specific field value indicates the same DM-RS transmission scheme, it may be able to define a rule that a DM-RS sequence is transmitted in a manner of being mapped to a frequency resource corresponding to the entire PRBs, which are allocated to perform PUSCH scheduling.

Option 5: When a plurality of TTIs are continuously PUSCH scheduled to a UE, if a plurality of UL grant DCI corresponding to a plurality of the TTIs indicate the UE to use a different comb-type (or comb-pattern), it may be able to define a rule that the UE transmits a DM-RS sequence to the whole REs of a DM-RS symbol using a specific cyclic shift/base sequence to avoid the increase of PAPR. In this case, the cyclic shift/base sequence can be determined by UL grant DCI on a predefined/promised TTI. Or, it may use a separately configured cyclic shift/base sequence or a cyclic shift/base sequence configured via higher layer signaling. The abovementioned operation of the UE can be performed only when the operation is indicated via higher layer signaling/physical layer signaling.

Option 6: When a plurality of TTIs are continuously PUSCH scheduled to a UE, if a plurality of UL grant DCI corresponding to a plurality of the TTIs indicate the UE to use a different DM-RS mapping structure (e.g., one UL grant DCI indicates the UE to transmit a DM-RS by mapping the DM-RS to the entire REs of a symbol and another UL grant DCI indicates the UE to transmit a DM-RS by mapping the DM-RS to an RE corresponding to a specific comb-pattern), the UE can transmit the DM-RS using a cyclic shift indicated by UL grant DCI corresponding to a PUSCH transmission scheduled at a specific TTI, which is determined according to a predefined rule, and/or a base sequence which is generated according to a UL resource scheduled at the TTI. Or, if a plurality of UL grant DCI indicate the UE to use a different DM-RS mapping structure, the UE can transmit a DM-RS using a cyclic shift indicated by UL grant DCI corresponding to a PUSCH transmission scheduled at a specific TTI, which is configured/indicated via higher layer signaling or physical layer signaling, and/or a base sequence which is generated according to a UL resource scheduled at the specific TTI. Or, if a plurality of UL grant DCI indicate the UE to use a different DM-RS mapping structure, the UE can transmit a DM-RS by mapping the DM-RS to the entire REs using a cyclic shift indicated by UL grant DCI, which indicates the DM-RS to be always transmitted in a manner of being mapped to the entire REs, and/or a base sequence which is generated according to a UL resource scheduled at a specific TTI. Or, if a plurality of UL grant DCI indicate the UE to use a different DM-RS mapping structure, the UE can transmit a DM-RS by mapping the DM-RS to the entire REs of a symbol using a cyclic shift/base sequence which is configured via higher layer signaling.

Option 7: When a plurality of TTIs are continuously PUSCH scheduled to a UE, the UE may not expect that a plurality of UL grant DCI corresponding to a plurality of the TTIs indicate the UE to use a different DM-RS mapping structure (e.g., one UL grant DCI indicates the UE to transmit a DM-RS by mapping the DM-RS to the entire REs of a symbol and another UL grant DCI indicates the UE to transmit a DM-RS by mapping the DM-RS to an RE corresponding to a specific comb-pattern). Similarly, the UE may not expect that a plurality of UL grant DCI corresponding to a plurality of the TTIs indicate a different cyclic shift. In the situation above, if a different DM-RS mapping structure or a different cyclic shift is indicated via a plurality of the UL grant DCI, the UE can drop the entire PUSCH scheduled at a corresponding TTI or a part of the PUSCH.

Option 7-1: A UE does not expect that an RA (resource allocation) field value included in UL grant DCI, which schedules a plurality of TTIs, indicates a different PUSCH resource allocation. If a different PUSCH resource allocation is indicated, it may be able to define a rule that the UE performs transmission on a specific TTI corresponding to retransmission only among TTIs including a TTI to which a predetermined or a bigger resource is allocated, a preceding TTI in time, the last TTI in time, and a plurality of TTIs corresponding to initial transmission and retransmission. Or, the UE may drop all of a plurality of the TTIs.

Power Control for Shared DM-RS Symbol

When a plurality of TTIs transmit DM-RSs in the same symbol and a plurality of the TTIs are scheduled to a UE, if PUSCH transmit power corresponding to two TTIs is differently configured, transmit power of a DM-RS symbol may become ambiguous. When a plurality of TTIs are scheduled to a UE, a method of configuring transmit power of a DM-RS symbol is described in the following in detail.

Option 1: Transmit power of a DM-RS symbol can be determined according to transmit power set to PUSCH corresponding to a TTI, which is determined according to a predefined rule, or a specific TTI configured/indicated via higher layer signaling or physical layer signaling.

Option 2: Transmit power of a DM-RS symbol can be determined according to transmit power set to PUSCH corresponding to a TTI to which a bigger UL resource is allocated to transmit the PUSCH.

Option 3: When a plurality of TTIs transmit DM-RSs in the same symbol, it may be able to define a rule that a plurality of the TTIs follow a specific transmit power value configured/indicated via higher layer signaling. Or, it may be able to define a rule that a plurality of the TTIs follow a transmit power value determined by a specific parameter which is configured/indicated via higher layer signaling.

More generally, when DM-RSs for a plurality of TTIs are transmitted in the same symbol and a plurality of the TTIs are scheduled to a UE, a method of performing power control is proposed in the following.

Option 1: When DM-RSs for a plurality of TTIs are configured to be transmitted in the same symbol and a plurality of the TTIs are scheduled to a UE, transmit power for a plurality of the TTIs can be determined by UL grant DCI that schedules a specific TTI (e.g., first TTI) among a plurality of the TTIs. More specifically, transmit power of a UE can be determined by a TPC (transmit power control) field included in UL grant DCI. In this case, the remaining UL grant DCI may exist except specific UL grant DCI, which is used for determining the transmit power. A transmit power-related parameter (e.g., TPC field) included in the remaining UL grant DCI can be ignored. When a plurality of contiguous TTIs are scheduled to a UE, "the rule of determining the transmit power of a plurality of the TTIs using the UL grant DCI that schedules the specific TTI (e.g., first TTI)" is applied during specific time duration only. In this case, the specific time duration can be defined in advance (e.g., 1 ms), can be signaled via physical layer signaling, or can be configured via higher layer signaling. And, transmit power for time duration appearing after the specific time duration can be determined by a specific field (e.g., TPC) included in UL grant DCI that schedules a specific TTI (e.g., a first TTI appearing after the specific time duration) appearing after the specific time duration.

Option 2: When DM-RSs for a plurality of TTIs are configured to be transmitted in the same symbol and a plurality of the TTIs are scheduled to a UE, transmit power for a plurality of the TTIs can be determined by specific UL grant DCI. Specifically, the specific UL grant DCI may correspond to (1) UL grant DCI that schedules one or more TTIs defined/promised in advance among a plurality of the TTIs or (2) a specific DCI type (slow/first DCI or fast/second DCI) of two-level DCI. Specifically, transmit power of the UE can be determined by a TPC field included in the specific UL grant DCI. In this case, the remaining UL grant DCI may exist except the specific UL grant DCI, which is used for determining the transmit power. A transmit power-related parameter (e.g., TPC field) included in the remaining UL grant DCI can be ignored. It may be able to define a rule that the power configuration method is to be applied to a scheduling target TTI of specific UL grant DCI performing multi-TTI scheduling only or a target TTI which is scheduled by a specific type (slow/first DCI or fast/second DCI) of two-level DCI only. Or, it may be able to define a rule that transmit power of all TTIs, which are scheduled during specific time duration (e.g., 1 ms), is to be determined by a TPC field of a first UL grant DCI of the time duration.

In particular, transmit power of a UE is restricted by a field value of a specific DCI field. This is aimed for securing efficiency of UL transmission by minimizing a change of the transmit power of the UE. If the transmit power of the UE changes according to a TTI, a ratio occupied by a power transition section of a transmitter of the UE or a power amplifier related to the transmitter increases, thereby deteriorating the efficiency of the transmitter.

Moreover, as mentioned in the foregoing description, when DM-RSs for a plurality of TTIs are transmitted in the same symbol, if a DM-RS transmission resource is allocated to a UE irrespective of a resource for transmitting PUSCH, DM-RS transmit power can be set to the UE via higher layer signaling or physical layer signaling irrespective of PUSCH transmit power. Or, it may be able to define a rule that the UE follows a DM-RS transmit power value determined by a separate parameter configured/indicated by higher layer signaling.

According to current LTE standard, a base sequence for generating a DM-RS sequence is determined according to a size of a scheduled PUSCH RB. According to a part of the aforementioned proposals, it may be necessary to generate a sequence of a short length, which is not defined in the current LTE standard operation. For example, when it is defined as an RS is to be mapped to a partial RE only of an SC-FDMA symbol of an RB, if 1 RB is scheduled using PUSCH, ambiguity may occur in generating a sequence. Although X (X>=1) RB is allocated, since a length of a sequence to be actually generated does not correspond to X*12 subcarriers, it is not matched with the current standard.

If RE mapping is defined in a UE in a manner that an RS is mapped to M_RE number of REs only among 12 REs of an SC-FDMA symbol of an RB, the UE may expect that X RB is scheduled by PUSCH to satisfy M_RE*X>=Y (where, Y corresponds to a predefined specific natural number, for example, Y=36 or 12). Or, the UE may expect that X RB is scheduled by PUSCH to satisfy M_RE*X<36 and M_RE*X=12 or 24. If RBs not satisfying the M_RE*X>=Y are scheduled by PUSCH, the UE can drop the PUSCH.

Or, it may be able to define a rule that PUSCH is to be scheduled to a UE by defining a scheduling unit in a unit of {12/M_RE}. For example, if RE mapping is defined in a manner that an RS is mapped to 6 REs among 12 REs of an SC-FDMA symbol of an RB, PUSCH can be scheduled in a unit of {12/6}=2 RBs.

In the foregoing description, an example that an SC-FDMA symbol of an RB is configured by 12 REs has been explained. The present invention can also be applied to a case that an SC-FDMA symbol of an RB is configured by the different number of REs.

As a further different proposal, when DM-RSs for a plurality of TTIs are transmitted in an SC-FDMA symbol of the same position or a DM-RS for a TTI is transmitted in a specific symbol belonging to the TTI or a specific symbol not belonging to the TTI, a DM-RS structure can be defined/ promised in advance or can be signaled to a UE via higher layer signaling or physical layer signaling. A rule for the DM-RS structure can be applied during specific time duration. In this case, the specific time duration can also be defined/promised in advance or signaled. The specific time duration can be independently (differently) defined/promised according to a TTI length or can be signaled to the UE via higher layer signaling or physical layer signaling.

The UE can report information on a DM-RS structure capable of being supported by the UE to a base station. Or, the UE can report information on a DM-RS structure capable of being supported by the UE according to a TTI length.

Figure 16:
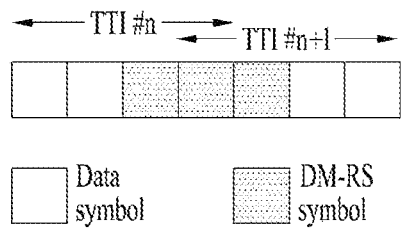
FIG. 16 illustrates an additional DM-RS symbol except a DM-RS symbol shared between TTIs.

As a further different proposal, when DM-RSs for a plurality of TTIs are transmitted in an SC-FDMA symbol of the same position, it may be able to define a rule that a DM-RS for a TTI is to be additionally transmitted in one or more symbols within an individual TTI irrespective of the SC-FDMA symbol. Whether to apply the rule can be determined according to a TTI length. Or, whether to apply the rule can be determined according to a network configuration via higher layer/physical layer signaling. Specifically, the rule can be applied to a TTI for transmitting PUCCH including HARQ-ACK. FIG. 16 illustrates an example of the abovementioned proposal.

It may be able to define a rule that the same cyclic shift, a value to which a predefined/predetermined offset is added, or a cyclic shift configured via higher layer/physical layer signaling is to be used by an additionally transmitted DM-RS and a DM-RS transmitted in a symbol shared by a plurality of TTIs.

It may be able to define a rule that (1) the number of symbols in which the additionally transmitted DM-RS is transmitted within an individual TTI and (2) symbols in which the additionally transmitted DM-RS is transmitted within an individual TTI are to be defined/promised in advance or are to be determined by a configuration of a network via higher layer/physical layer signaling.

And, (1) the number of symbols in which the additionally transmitted DM-RS is transmitted within an individual TTI and (2) symbols in which the additionally transmitted DM-RS is transmitted within an individual TTI can be differently configured according to a TTI length.

DM-RS On/Off by Multi-TTI Scheduling

When a plurality of UL data channels for a plurality of TTIs are scheduled by single UL grant DCI, it may be able to define a rule that a DM-RS is to be transmitted at TTIs as many as TTIs determined during specific time duration corresponding to a plurality of scheduled TTIs or a TTI of determined timing only. The number/timing of TTIs at which a DM-RS is to be transmitted can be defined/promised in advance or can be indicated by higher layer signaling or the UL grant DCI.

In this case, all or a part of information on whether a DM-RS or a plurality of DM-RSs to be transmitted during the time duration are transmitted in a manner of being mapped to the entire REs of a symbol or an RE corresponding to a specific comb, a DM-RS cyclic shift, an OCC, and comb-pattern information can be indicated to a UE via higher layer signaling or physical layer signaling. In this case, specifically, the physical layer signaling may correspond to UL grant DCI that schedules a plurality of the UL data channels.

When PUSCHs for a plurality of TTIs are scheduled by single UL grant DCI, it may be able to define a rule that a DM-RS is to be transmitted in an SC-FDMA symbol only which is determined within specific time duration corresponding to a plurality of scheduled TTIs. An index of the SC-FDMA symbol in which the DM-RS is to be transmitted can be defined/promised in advance or can be indicated by higher layer signaling or the UL grant DCI. For example, the index of the SC-FDMA symbol in which the DM-RS is to be transmitted can be differently (or identically) defined/promised according to the number of TTIs at which the DM-RS is transmitted during specific time duration corresponding to a plurality of the scheduled TTIs or timing of a TTI. In this case, all or a part of information on whether a DM-RS or a plurality of DM-RSs to be transmitted during the time duration are transmitted in a manner of being mapped to the entire REs of a symbol or an RE corresponding to a specific comb pattern, a DM-RS cyclic shift, an OCC, and comb-pattern information can be indicated to a UE via higher layer signaling or physical layer signaling. In this case, specifically, the physical layer signaling may correspond to UL grant DCI that schedules a plurality of the UL data channels.

When a plurality of DL data channels for a plurality of TTIs are scheduled by single DL grant DCI, it may be able to define a rule that a DM-RS is to be transmitted at TTIs as many as TTIs determined during specific time duration during which a plurality of UL control channels including HARQ-ACK on a plurality of the scheduled DL data channels are transmitted or a TTI of determined timing only. The number/timing of TTIs at which a DM-RS is to be transmitted can be defined/promised in advance by the DL grant DCI or can be indicated by higher layer signaling or the UL grant DCI. In this case, all or a part of information on whether a DM-RS or a plurality of DM-RSs to be transmitted during the time duration are transmitted in a manner of being mapped to the entire REs of a symbol or an RE corresponding to a specific comb pattern, a DM-RS cyclic shift, an OCC, and comb-pattern information can be indicated to a UE via higher layer signaling or physical layer signaling. In this case, specifically, the physical layer signaling may correspond to DL grant DCI that schedules a plurality of the DL data channels.

When a plurality of DL data channels for a plurality of TTIs are scheduled by single DL grant DCI, it may be able to define a rule that a DM-RS is to be transmitted in an SC-FDMA symbol only which is determined within specific time duration during which a plurality of UL control channels including HARQ-ACK on a plurality of the scheduled DL data channels are transmitted. An index of the SC-FDMA symbol in which the DM-RS is to be transmitted can be defined/promised in advance or can be indicated by higher layer signaling or the UL grant DCI. For example, the index of the SC-FDMA symbol in which the DM-RS is to be transmitted can be differently defined/promised according to the number of TTIs at which the DM-RS is transmitted within specific time duration during which a plurality of the UL control channels are transmitted or timing of a TTI. In this case, all or a part of information on whether a DM-RS or a plurality of DM-RSs to be transmitted during the time duration are transmitted in a manner of being mapped to the entire REs of a symbol or an RE corresponding to a specific comb pattern, a DM-RS cyclic shift, an OCC, and comb-pattern information can be indicated to a UE via higher layer signaling or physical layer signaling. In this case, specifically, the physical layer signaling may correspond to DL grant DCI that schedules a plurality of the DL data channels.

As mentioned in the foregoing description, if the HARQ-ACK on a plurality of the scheduled DL data channels is transmitted on a single UL control channel, all or a part of information on an SC-FDMA symbol index at which a DM-RS is to be positioned for the UL control channel, information on whether a DM-RS is transmitted in a manner of being mapped to the entire REs of a DM-RS symbol or an RE corresponding to a specific comb pattern, a DM-RS cyclic shift, an OCC, and a comb pattern information can be indicated to a UE via higher layer signaling or physical layer signaling. In this case, specifically, the physical layer signaling may correspond to DL grant DCI that schedules a plurality of the DL data channels.

Dynamic DM-RS Insertion

When a short TTI of two symbols is introduced, if a DM-RS occupies one symbol in every sTTI, it is not preferable in terms of transmission efficiency. Hence, when a plurality of contiguous sTTIs are scheduled to a UE, a method of dynamically inserting a DM-RS is considering. In particular, a network dynamically indicates whether a DM-RS is transmitted in every sTTI via dynamic signaling. It may consider methods described in the following as a method of indicating the insertion of the DM-RS.

As a method, it may be able to define a rule that a specific field included in UL grant DCI, which schedules a specific sTTI, indicates whether or not a DM-RS is transmitted for a plurality of sTTIs including the specific sTTI. Specifically, this method allows a DM-RS to be transmitted for a plurality of sTTIs among the specific number of contiguous sTTIs. Specifically, this method can include a method of defining a position of a symbol in which a DM-RS is transmitted by fixing the position in a sTTI in advance.

For example, it may be able to define a DM-RS to be transmitted in a manner of being fixed in a first symbol within an sTTI. If a field indicating whether or not a DM-RS is transmitted in each sTTI is configured by 4 bits in UL grant DCI, it is able to define a rule that 4 bits of the UL grant DCI, which schedules an sTTI #n, can indicate whether or not a DM-RS is transmitted for 4 contiguous sTTIs including the sTTI #n. More generally, it is able to define a rule that the bitmap (i.e., 4 bits in the UL grant DCI) indicates an sTTI at which a DM-RS is transmitted among a plurality of sTTIs which are not contiguous within specific time duration (e.g., within 1 subframe or 1 ms).

As a different method, it is able to define a rule that a plurality of patterns indicating positions of symbols in which a DM-RS is transmitted are to be defined for a plurality of TTIs corresponding to specific time duration (e.g., 1 subframe or 1 ms) and one of a plurality of the patterns is to be indicated. More generally, it is able to define a plurality of patterns of which density and/or a position of a time axis of a DM-RS is different within a plurality of TTIs corresponding to specific time duration and one of a plurality of the patterns is indicated to select a TTI or a symbol in which a DM-RS is actually transmitted within the time duration.

For example, the pattern can be defined as (1) transmitting a DM-RS (in a specific symbol) at all TTIs, (2) transmitting a DM-RS (in a specific symbol) in every odd numbered TTI or every even numbered TTI (in other word, a DM-RS is transmitted at one TTI in every two TTIs), (3) transmitting a DM-RS (in a specific symbol) at a first TTI within a UL subframe slot, and (4) transmitting a DM-RS at a TTI having a period of the specific number of TTIs (or having the specific number of symbols) defined/configured/signaled by a scheduled TTI in advance. As a different example, the pattern can be defined as a DM-RS is to be transmitted (in a specific symbol) at the different number of TTIs among a plurality of TTIs corresponding to specific time duration. For example, a pattern #1 can indicate a DM-RS to be transmitted at TTI #n to TTI #n+3, a pattern #2 can indicate a DM-RS to be transmitted at TTI #n and TTI #n+2, a pattern #3 can indicate a DM-RS to be transmitted at TTI #n+1 and TTI #n+3, and a pattern #4 can indicate a DM-RS to be transmitted at TTI #n.

When a DM-RS transmission is set to a TTI or a specific interval, a 'specific symbol' included in the TTI or the specific interval may indicate all symbols or a first symbol included in the TTI or the specific interval. More specifically, a position to which a DM-RS is transmitted/mapped may vary according to the TTI or the specific interval.

As a further different method, it may not promise/define a position of a symbol in which a DM-RS is transmitted within an sTTI by fixing the symbol position. In this case, it may be able to define additional signaling to indicate a position of a symbol in which a DM-RS is transmitted within an sTTI. For example, when a field indicating information on whether or not a DM-RS is transmitted at each sTTI is configured by 3 bits in UL grant DCI, 2 bits of the UL grant DCI for scheduling an sTTI #n indicate one sTTI at which a DM-RS is transmitted and the remaining 1 bit can indicate a symbol to which the DM-RS is to be mapped among symbols of the sTTI at which the DM-RS is transmitted. As a different example, 2 bits of the UL grant DCI for scheduling the sTTI #n indicate whether or not a DM-RS is transmitted in each of 2 sTTIs including the sTTI #n and the remaining 1 bit can indicate a symbol to which the DM-RS is to be mapped among symbols of the sTTI at which the DM-RS is transmitted. As a further different example, when a field indicating information on whether or not a DM-RS is transmitted at each sTTI is configured by 4 bits in UL grant DCI, 2 bits of the UL grant DCI for scheduling an sTTI #n indicate whether or not a DM-RS is transmitted in each of 2 sTTIs including the sTTI #n and the remaining 2 bits can indicate a symbol to which the DM-RS is to be mapped among symbols of each sTTI when the DM-RS is transmitted at each of the two sTTIs including the sTTI #n. In case of applying the present method, in order to more precisely perform channel estimation in a channel situation in which time-varying is serious, it may be able to increase a space between symbols to which a DM-RS is mapped to more flexibly transmit a DM-RS.

The physical layer signaling indicating whether or not a DM-RS is transmitted for each of a plurality of TTIs corresponding to specific time duration (e.g., 1 subframe or 1 ms) may correspond to (1) respective UL grant DCIs that schedule a plurality of the TTIs, (2) UL grant DCI that schedules one or more predefined/promised TTIs among a plurality of the TTIs, or (3) a specific DCI type (slow/first DCI or fast/second DCI) of two-level DCI.

Information on whether or not a DM-RS is transmitted for each of a plurality of TTIs corresponding to specific time duration (e.g., 1 subframe or 1 ms) can be indicated by a legacy specific field (e.g., a DM-RS cyclic shift field) included in UL grant DCI or a new field. Specifically, information on whether or not a scheduling target (s) TTI includes a DM-RS and/or information on a symbol in which a DM-RS is transmitted (in time domain) can be indicated by a specific state of a DM-RS cyclic shift of UL grant DCI.

For example, a plurality of sTTIs belonging to specific time duration can be configured to use the same DM-RS cyclic shift and/or OCC in advance. Hence, information on whether or not a DM-RS is transmitted in each of a plurality of the sTTIs and/or information on a symbol in which a DM-RS is transmitted can be indicated via the DM-RS cyclic shift field.

As a different example, when a short TTI or a dynamic DM-RS insertion operation is configured, it may be able to configure partial values to be used only among values of a cyclic shift of a DM-RS and/or an OCC. A partial bit among 3 bits can indicate information on whether or not a DM-RS is transmitted at each sTTI and/or information on a symbol in which a DM-RS is transmitted within an sTTI.

Specifically, information on whether or not a scheduling target (s)TTI includes a DM-RS and/or information on a symbol in which a DM-RS is transmitted using a frequency hopping flag field (1 bit) included in UL grant DCI. It may be able to define a rule that the present rule is to be applied only when a short TTI is configured or a dynamic DM-RS insertion operation is configured.

Specifically, when sPUSCH scheduling is performed, it may be able to define a rule that a resource allocation type 1 is not to be used. In this case, a resource allocation type field (1 bit) can be configured to indicate information on whether or not a scheduling target (s)TTI includes a DM-RS and/or information on a symbol in which a DM-RS is transmitted.

As a further different method, it may be able to define a rule that a DM-RS is always to be transmitted without any signaling related to information on whether or not a DM-RS is transmitted by default at a specific sTTI within specific time duration. Specifically, when the DM-RS is always transmitted by default at an sTTI, the sTTI can be defined by 1 per slot. Or, it may be able to define a rule that a DM-RS is to be transmitted without any signaling by default at a first sTTI only in each slot. When the remaining sTTIs are scheduled, information on whether or not the sTTIs include a DM-RS and/or information on a symbol in which a DM-RS is transmitted can be indicated by a DM-RS cyclic shift field. In this case, a cyclic shift and/or an OCC used for transmitting a DM-RS (1) can be defined to be identical to that of a DM-RS which is transmitted by default within specific time duration, (2) can be defined to be identical to that of a DM-RS which is transmitted by default immediately before the DM-RS, (3) can be defined by predefined values, or (4) can be defined by values induced using an identifier (e.g., RNTI) of a UE.

Detail Explanation on Dynamic DM-RS Insertion

When a plurality of sTTIs are scheduled to a UE, a dynamic DM-RS insertion method can be introduced to make a network indicate information on whether or not a DM-RS is transmitted in every sTTI using dynamic signaling. The signaling method is explained in more detail in the following.

As a method, it may be able to define a rule that a specific field included in UL grant DCI, which schedules a specific sTTI, indicates whether or not a DM-RS is transmitted for each of a plurality of sTTIs including the specific sTTI. For example, it may be able to define a rule that a specific field included in UL grant DCI, which schedules an sTTI #n, indicates whether or not a DM-RS is transmitted for a plurality of sTTIs including "the sTTI #n, sTTI(s) appearing before the sTTI #n, and/or sTTI(s) appearing after the sTTI #n" such as {sTTI #n−2, sTTI #n−1, sTTI #n, sTTI #n+1}, {sTTI #n−1, sTTI #n, sTTI #n+1, sTTI #n+2}, or {sTTI #n, sTTI #n+1, sTTI #n+2, sTTI #n+3}. In this case, a DM-RS transmission method (PRB allocation and/or power allocation and/or cyclic shift and/or OCC, etc.) may follow a configuration at a schedule target sTTI of UL grant DCI, follow a configuration indicated by UL grant DCI, or can be configured by higher layer signaling in advance. For example, a DM-RS transmission TTI indicated by the UL grant DCI can be indicated in a form of a relative time offset from a scheduling target TTI. More specifically, the time offset may correspond to a unit of sTTI.

As mentioned in the foregoing description, according to an operation of dynamic DM-RS insertion, since a specific sTTI does not include a DM-RS, it may be necessary for an eNB to borrow a channel estimation result in a DM-RS from a different sTTI in which DM-RS transmission is included. More generally, when a plurality of sTTIs perform channel estimation or a different operation by sharing a DM-RS symbol, the channel estimation or the different operation can be supported only when DM-RS-related configuration information on a plurality of the sTTIs and resource allocation satisfy a prescribed condition. In order to support the operation, it is necessary for a UE and an eNB to identically understand an operation described in the following.

When a plurality of sTTIs are scheduled to a UE during specific time duration to support dynamic DM-RS insertion, the UE may assume that a state of a DM-RS cyclic shift is to be identically set to a plurality of the sTTIs. And, when a plurality of sTTIs are scheduled to a UE during specific time duration, the UE may assume that resource allocation is to be identically indicated to a plurality of the sTTIs. Or, when resource allocation is performed on a plurality of the sTTIs, the UE may assume that resource allocation of an sTTI not including a DM-RS is to be a subset of resource allocation of an sTTI including a DM-RS.

Detail Explanation on Dynamic DM-RS Insertion

As a method, a specific field included in UL grant DCI, which schedules a specific sTTI, can indicate a symbol in which a DM-RS is transmittable. And, a candidate symbol in which a DM-RS is transmittable can be restricted to a specific symbol included in a scheduled sTTI, a specific symbol included in an sTTI immediately before the scheduled sTTI, and a specific symbol included in an sTTI immediately after the scheduled sTTI on the basis of the scheduled sTTI.

As a scheme of configuring a state of a specific included in the UL grant DCI, it may consider (1) first symbol of the scheduled sTTI, (2) last symbol of the scheduled sTTI, (3) last symbol of the sTTI immediately before the scheduled sTTI, (4) first symbol of the sTTI immediately after the scheduled sTTI, (5) (predefined/promised) specific symbol of the scheduled sTTI except the first symbol and the last symbol, and (6) a state of not transmitting a DM-RS. As described in (1) and (2), the first and the last symbol are considered as a DM-RS transmission candidate symbol. This is because, when decoding is performed, it is necessary to easily share a DM-RS with the sTTI immediately before the scheduled sTTI or the sTTI immediately after the scheduled sTTI.

Fallback/Default UE Operation

When a UE misses UL grant DCI for a specific sTTI, if the specific sTTI includes DM-RS transmission and the remaining sTTIs do not include DM-RS transmission, since DM-RS for the remaining sTTIs does not exist, an eNB may fail to perform UL demodulation. Hence, it is necessary to define an operation in consideration of the abovementioned situation.

As a proposal, in order to make a UE recognize a situation that a plurality of sTTIs are scheduled to a UE during specific time duration, it may be able to define a rule that such a signal as a UL assignment indicator is to be indicated via UL grant DCI. Specifically, when a plurality of contiguous sTTIs are scheduled or a plurality of sTTIs are scheduled within predefined/signaled time duration, the UL assignment indicator can indicate whether or not a plurality of the sTTIs are scheduled in an ascending order or a descending order.

When a specific sTTI is scheduled to a UE, if the UE recognizes that the UE has missed scheduling DCI for a previous sTTI via the UL assignment indicator, it is able to define a rule that the UE transmits a DM-RS to a predefined/signaled time/frequency resource at the specific sTTI. Although the UE is indicated not to transmit a DM-RS at the specific sTTI, the UE can transmit the DM-RS at the specific sTTI by ignoring the indication. In this case, it may be able to define a rule that the DM-RS is to be transmitted in a manner of puncturing (or rate matching) data in a predefined/signaled time/frequency resource. More specifically, in case of performing rate matching on data, it may be able to map the data to a time/frequency resource rather than a time/frequency resource which is signaled via predefined/promised higher layer signaling/physical layer signaling irrespective of whether or not a DM-RS is transmitted. In this case, it may obtain a gain in terms of transmit power of the UE. Data mapping can be differently configured via higher layer/physical layer signaling.

As a further different method, when a specific sTTI is scheduled to a UE, if the UE does not receive any scheduling for more than prescribed time, the UE can transmit a DM-RS at the scheduled sTTI (i.e., scheduling target sTTI) irrespective of whether or not a DM-RS indicated by UL grant DCI is transmitted. In this case, it may be able to define a rule that the DM-RS is to be transmitted in a manner of puncturing (or rate matching) data. More specifically, in case of performing rate matching on data, it may be able to map the data to a time/frequency data rather than a time/frequency resource which is signaled via predefined/promised higher layer signaling/physical layer signaling irrespective of whether or not a DM-RS is transmitted. In this case, it may obtain a gain in terms of transmit power of the UE. Data mapping can be differently configured via higher layer/physical layer signaling.

Definition of Separate Sequences per Resource with Cyclic Shift Hopping

Separate Sequences Generation per Resource with Cyclic Shift Hopping

When a plurality of TTIs transmit a DM-RS in the same symbol, a base sequence for generating a DM-RS sequence for a TTI can be determined not by a total size of resources allocated for a UL channel (e.g., PUSCH) but by a resource unit (e.g., X PRB) having a predefined/promised specific size. In particular, the base sequence, which is determined by the resource unit having the predefined/promised specific size, can be mapped/transmitted in a manner of being repeated as much as the size in allocated UL resources.

Figure 17:
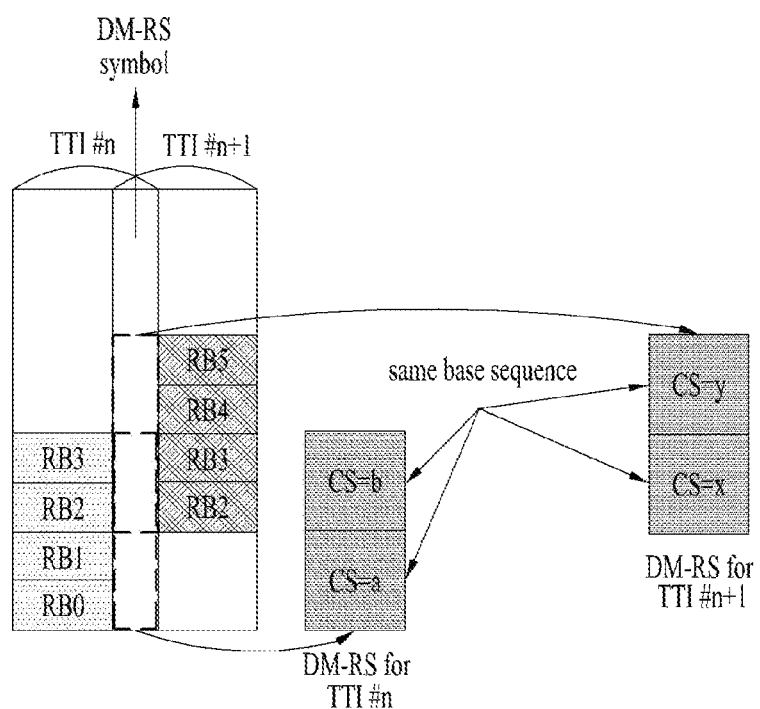
FIG. 17 illustrates a DM-RS for each TTI in a DM-RS symbol shared between TTIs.

In this case, PAPR can be increase in a symbol in which a DM-RS is transmitted. In order to minimize the increase of the PAPR, it may be able to define a rule that a different (independent) cyclic shift is to be applied to the same DM-RS sequence which is determined according to a resource unit having a specific size. Referring to FIG. 17, a PRB index {0,1,2,3} and a PRB index {2,3,4,5} are respectively assigned to a TTI #n and a TTI #n+1 as a PUSCH resource. DM-RS sequences for two TTIs are transmitted to the same symbol in a manner of being multiplexed using a different cyclic shift while the same base sequence is used in a unit of 2 PRBs.

Although the examples for the proposed schemes correspond to explanation/description on PUSCH and/or PUSCH DM-RS, the examples can also be applied to PUCCH and/or PUCCH DM-RS. And, although a part of the proposed schemes has been explained with a method that two adjacent TTIs transmit a DM-RS in the same symbol, the method can also be applied to a method that three or more TTIs transmit a DM-RS in the same symbol.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 18:
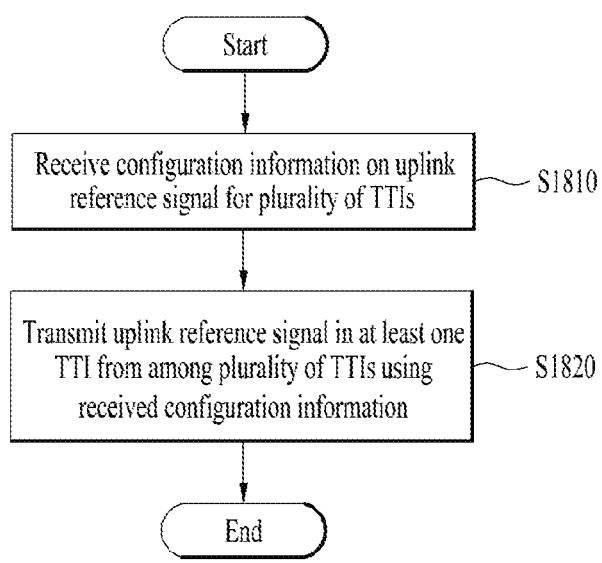
FIG. 18 is a flowchart illustrating an operation of a UE.

FIG. 18 is a flowchart illustrating an operation of a terminal.

The terminal may receive configuration information on an uplink reference signal for a plurality of TTIs from a base station [S1810]. The terminal may transmit an uplink reference signal in at least one TTI among the plurality of TTIs using the received configuration information [S1820]. The configuration information may be included in signaling that schedules at least one TTI among the plurality of TTIs.

The uplink reference signal may be transmitted in each of symbols of the at least one TTI.

The configuration information may be included in downlink control information that schedules a TTI from among the plurality of TTIs. Or, the configuration information includes a bit field that indicates TTIs in which the uplink reference signal is to be transmitted. The bit field may indicate whether or not the uplink reference signal is transmitted in each of a predetermined number of contiguous TTIs including a TTI scheduled by the configuration information.

The configuration information indicates one of a plurality of candidate patterns in which the uplink reference signal is to be transmitted and each of a plurality of the candidate patterns may indicate a TTI of prescribed time duration during which the uplink reference signal is transmitted or a symbol in the TTI.

The method may further include the step of receiving information on a symbol in at least one TTI at which the uplink reference signal is to be transmitted.

The configuration information includes a bit field indicating a symbol in a TTI at which the uplink reference signal is to be transmitted and the bit field may indicate symbols of the predetermined number of contiguous TTIs including the TTI scheduled by the configuration information.

And, configuration information to be used for transmitting the uplink reference signal may be included in signaling that schedules a predetermined TTI from among a plurality of the TTIs.

The configuration information may be included in signaling that schedules a TTI to which a largest uplink transmission resource is allocated from among the plurality of TTIs.

The terminal may expect that signaling scheduling the plurality of TTIs indicate configuration information on the same uplink reference signal.

The configuration information may include at least one selected from the group consisting of a cyclic shift, an OCC (orthogonal cover code), transmit power, RE (resource element) mapping of uplink reference signal, and resource allocation.

Figure 19:
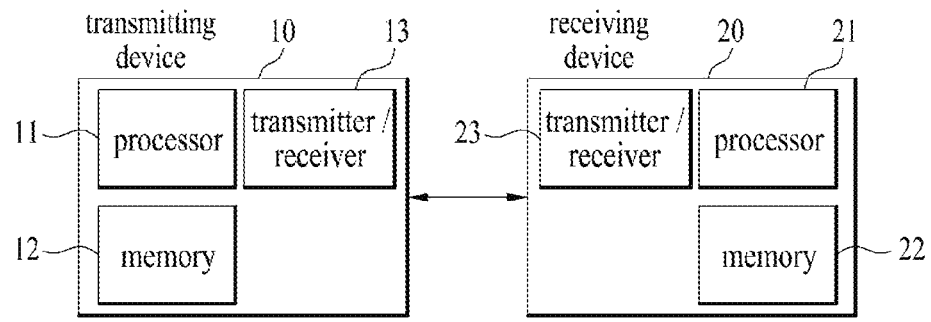
FIG. 19 is a block diagram of a device for implementing embodiment(s) of the present invention.

FIG. 19 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of transmitting an uplink reference signal by a user equipment in a wireless communication system, the method comprising:
  receiving uplink (UL) grant downlink control information (DCI) that schedules a transmission time interval (TTI); and
  transmitting a demodulation reference signal (DM-RS) for the TTI based on the UL grant DCI,
  wherein the UL grant DCI includes a first field for indicating one of a plurality of DM-RS candidate patterns predefined for a plurality of contiguous TTIs, and
  wherein each of the plurality of predefined candidate patterns indicates at least one symbol for DM-RS transmission from among a plurality of symbols included in the plurality of contiguous TTIs.

2. The method of claim 1, wherein the plurality of contiguous TTIs is included in a predetermined time duration.

3. The method of claim 2, wherein the predetermined time duration includes 14 symbols in a time domain.

4. The method of claim 1, wherein the UL grant DCI further includes a second field regarding resource element (RE) mapping of the DM-RS for the TTI.

5. The method of claim 4, wherein the second field indicates whether the DM-RS for the TTI is transmitted on only some of REs of a symbol used for the DM-RS.

6. The method of claim 5, wherein the second field further indicates whether the DM-RS for the TTI is transmitted on REs corresponding to even indexed subcarriers or REs corresponding to odd indexed subcarriers among the REs of the symbol used for the DM-RS.

7. A device for controlling transmission of an uplink reference signal in a wireless communication system, the device comprising:
  at least one processor; and
  at least one computer memory that is operably connectable to the at least one a processor and that has stored thereon instructions which, when executed, cause the at least one processor to perform operations comprising:
  receiving, via a transceiver, uplink (UL) grant downlink control information (DCI) that schedules a transmission time interval (TTI); and
  transmitting, via the transceiver, a demodulation reference signal (DM-RS) for the TTI based on the UL grant DCI,
  wherein the UL grant DCI includes a first field for indicating one of a plurality of DM-RS candidate patterns predefined for a plurality of contiguous TTIs, and
  wherein each of the plurality of predefined candidate patterns indicates at least one symbol for DM-RS transmission from among a plurality of symbols included in the plurality of contiguous TTIs.

8. The device of claim 7, wherein the plurality of contiguous TTIs is included in a predetermined time duration.

9. The device of claim 8, wherein the predetermined time duration includes 14 symbols in a time domain.

10. The device of claim 7, wherein the UL grant DCI further includes a second field regarding resource element (RE) mapping of the DM-RS for the TTI.

11. The device of claim 10, wherein the second field indicates whether the DM-RS for the TTI is transmitted on only some of REs of a symbol used for the DM-RS.

12. The device of claim 11, wherein the second field further indicates whether the DM-RS for the TTI is transmitted on REs corresponding to even indexed subcarriers or REs corresponding to odd indexed subcarriers among the REs of the symbol used for the DM-RS.

13. A method of receiving an uplink reference signal by a base station in a wireless communication system, the method comprising:
  transmitting, to a user equipment, uplink (UL) grant downlink control information (DCI) that schedules a transmission time interval (TTI); and
  receiving, from the user equipment, a demodulation reference signal (DM-RS) for the TTI based on the UL grant DCI,
  wherein the UL grant DCI includes a first field for indicating one of a plurality of DM-RS candidate patterns predefined for a plurality of contiguous TTIs, and
  wherein each of the plurality of predefined candidate patterns indicates at least one symbol for DM-RS transmission from among a plurality of symbols included in the plurality of contiguous TTIs.

14. A base station for receiving an uplink reference signal in a wireless communication system, the base station comprising:
  at least one processor; and
  at least one computer memory that is operably connectable to the at least one a processor and that has stored thereon instructions which, when executed, cause the at least one processor to perform operations comprising:
  transmitting, to a user equipment via a transceiver, uplink (UL) grant downlink control information (DCI) that schedules a transmission time interval (TTI); and
  receiving, to the user equipment via the transceiver, a demodulation reference signal (DM-RS) for the TTI based on the UL grant DCI,
  wherein the UL grant DCI includes a first field for indicating one of a plurality of DM-RS candidate patterns predefined for a plurality of contiguous TTIs, and
  wherein each of the plurality of predefined candidate patterns indicates at least one symbol for DM-RS transmission from among a plurality of symbols included in the plurality of contiguous TTIs.

* * * * *